United States Patent
Na et al.

(10) Patent No.: US 9,438,067 B2
(45) Date of Patent: Sep. 6, 2016

(54) WIRELESS CHARGING SYSTEM HAVING DIFFERENT CHARGING MODES

(75) Inventors: Gi-Yong Na, Seoul (KR); Si-Han Kim, Gwangju-si (KR)

(73) Assignee: KTHEPOWER INC. (KR)

( * ) Notice: Subject to any disclaimer, the term of this patent is extended or adjusted under 35 U.S.C. 154(b) by 169 days.

(21) Appl. No.: 14/241,758

(22) PCT Filed: Aug. 28, 2012

(86) PCT No.: PCT/KR2012/006849
§ 371 (c)(1),
(2), (4) Date: Feb. 27, 2014

(87) PCT Pub. No.: WO2013/032205
PCT Pub. Date: Mar. 7, 2013

(65) Prior Publication Data
US 2014/0210406 A1 Jul. 31, 2014

(30) Foreign Application Priority Data

Aug. 29, 2011 (KR) .................. 10-2011-0086586
Jul. 31, 2012 (KR) .................. 10-2012-0083727

(51) Int. Cl.
*H02J 7/00* (2006.01)
*H02J 7/02* (2016.01)
*H02J 5/00* (2016.01)
*H01F 38/14* (2006.01)

(52) U.S. Cl.
CPC ............... *H02J 7/025* (2013.01); *H01F 38/14* (2013.01); *H02J 5/005* (2013.01)

(58) Field of Classification Search
CPC ...... H02J 7/025; H01F 38/14; Y02T 90/122; B60L 11/182; Y02E 60/12
USPC ........................................................ 320/108
See application file for complete search history.

(56) References Cited

U.S. PATENT DOCUMENTS

| | | | | |
|---|---|---|---|---|
| 5,502,430 | A * | 3/1996 | Takahashi | H01F 27/2823 336/198 |
| 9,130,382 | B1 * | 9/2015 | Luo | H02J 7/025 |
| 2007/0069687 | A1 * | 3/2007 | Suzuki | H02J 7/0036 320/108 |
| 2007/0205855 | A1 * | 9/2007 | Hashimoto | H01F 5/003 336/200 |
| 2008/0094027 | A1 * | 4/2008 | Cho | H02J 7/00 320/108 |
| 2009/0140691 | A1 * | 6/2009 | Jung | H02J 7/025 320/108 |
| 2009/0167299 | A1 * | 7/2009 | Nishio | G01V 3/104 324/239 |
| 2010/0270867 | A1 * | 10/2010 | Abe | H02J 5/005 307/104 |
| 2011/0025264 | A1 * | 2/2011 | Mochida | H01M 10/425 320/108 |
| 2011/0057606 | A1 * | 3/2011 | Saunamaki | H02J 7/025 320/108 |
| 2011/0115429 | A1 * | 5/2011 | Toivola | H01F 38/14 320/108 |
| 2012/0146580 | A1 * | 6/2012 | Kitamura | H01F 38/14 320/108 |
| 2012/0242164 | A1 * | 9/2012 | Teggatz | H01F 38/14 307/104 |
| 2013/0082537 | A1 * | 4/2013 | Kim | H01F 38/14 307/104 |
| 2013/0127683 | A1 * | 5/2013 | Hoang | H01Q 1/22 343/858 |

FOREIGN PATENT DOCUMENTS

| | | |
|---|---|---|
| KR | 10-0928439 B1 | 11/2009 |
| KR | 10-0971714 B1 | 7/2010 |
| KR | 10-1001262 B1 | 12/2010 |
| KR | 10-2011-0052972 A | 5/2011 |
| WO | WO 2010/099242 A2 | 9/2010 |
| WO | WO 2010/135709 A1 | 11/2010 |
| WO | WO 2011/063053 A2 | 5/2011 |

OTHER PUBLICATIONS

International Written Opinion mailed Feb. 26, 2013, issued in corresponding International Patent Application No. PCT/KR2012/006849.
International Search Report mailed Feb. 26, 2013, issued in corresponding International Patent Application No. PCT/KR2012/006849.

* cited by examiner

*Primary Examiner* — Arun Williams
(74) *Attorney, Agent, or Firm* — Cantor Colburn LLP

(57) ABSTRACT

Provided is a wireless charging system having different wireless modes, the system comprising: a method of providing a coil having different charging modes in one set, which is performed by providing separate coils or providing a lead wire in the middle of one coil, when the coil having at least two different charging modes is provided in the one set in a receiver for the wireless charging system using non-contact magnetic induction, wherein when one charging mode is selected for one coil set, a status value of the coil for transmitting and receiving wireless power energy is detected, thereby enabling the one charging mode to be selected, and different charging modes is mounted in one wireless charging system so that a charging mode appropriate for optimum conditions can be selected according to states and charging conditions wireless power transmitting and receiving devices.

20 Claims, 22 Drawing Sheets

FIRST SET    SECOND SET    THIRD SET

FIRST SET    SECOND SET (A)

(B)

(C)

(A)

(B)

WIRELESS CHARGING SYSTEM HAVING DIFFERENT CHARGING MODES

CROSS-REFERENCE TO RELATED APPLICATIONS

This application is a national phase of International Application No. PCT/KR2012/006849, filed Aug. 28, 2012, which claims the benefit of Korean Application No. 10-2011-0086586, filed Aug. 29, 2011, and Korean Application No. 10-2012-0083727, filed Jul. 31, 2012 in the Korean Intellectual Property Office. All disclosures of the document(s) named above are incorporated herein by reference.

BACKGROUND OF THE INVENTION

1. Field of the Invention

The present invention relates, in general, to a wireless charging system, and, more particularly, to a wireless charging system having different charging modes in which one wireless charging system has different charging modes so that an optimum wireless charging mode can be selected as needed.

2. Description of the Related Art

Technologies for realizing wireless charging by installing a wireless transmitter and receiver in an electrical device have been developed. That is, a non-contact magnetic induction mode, namely, a wireless charging mode, has been devised. The non-contact charging mode refers to a mode of providing an electric current of a charging body, namely energy to a storage battery of a portable electronic device using inductive coupling by forming a first circuit operated by a high frequency in the charging body and forming a second circuit in a battery, namely, in the portable electronic device or the storage battery. The non-contact charging mode using the inductive coupling has been already used in some application fields (for example, electric toothbrushes, electric shavers and the like).

However, in order for the mode to be applied to portable electronic devices, such as cellular phones, portable MP3 players, CD players, MD players, cassette tape players, notebook computers, PDAs and the like, the volume and a weight for a charger added to a storage battery should be small, and in addition to the requirement, a deviation in charging efficiency resulting from a position where a portable electronic device or a storage battery is placed should also be improved.

Furthermore, in a case where the non-contact charging mode is applied to a cellular phone or a smart phone, the improvement of a deviation is needed, and a wireless charger based on a few modes according to predetermined modes has been only launched, and accordingly, it is problematic in that the wireless charger may not be charged when the mode is changed.

Also, in the non-contact charging mode, two or more coils are not provided, a design standard is not determined, and an accurate structure as to if each of coils is positioned at a terminal is not described. That is, even though conventional art 1 (Korean Patent No. 10-0928439) is characterized in that a lower core is positioned between a first upper core (coil) and a second upper core, and a controller determines whether any core of the lower core, the first upper core and the second upper core receives a signal transmitted from a contactless electric power receiving device, and transmits and controls the electric power signal through the relevant core to correspond to a result of the determination, the conventional art presents neither a coil (antenna) having a composite function nor an optimum design condition or structure.

Also, even though conventional art 2 (Korean Patent No. 10-0971714) is characterized in that a guidance pattern core of a first core unit has a lower core layer composed of a plurality of cores in an upper portion of a PCB and an upper core layer composed of a plurality of cores in an upper portion of an interval pattern, wherein the lower core layer and the upper core layer are positioned to cross each other and are provided in a multi-layer form, the conventional art presents neither a coil (antenna) having a composite function nor an optimum design condition clearly.

Moreover, even though conventional art 3 (Korean Patent No. 10-1001262) provides a chargeable case for a portable cellular phone including: a supporter stably fixed and detachably attached to a portable terminal; and a charging module installed in the supporter so that a magnetic field generated from a power source supplied from the outside can be transmitted by electromagnetic induction to the portable terminal when the portable terminal is stably fixed to the supporter, and at the same time, wireless charging can be carried out, the conventional art also presents neither a coil (antenna) having a composite function nor an optimum design condition clearly.

Accordingly, the development of a wireless charging mode having an optimum design condition at the same time as having different wireless modes has been needed.

SUMMARY OF THE INVENTION

Technical Problem

Accordingly, an object of the present invention is to provide a wireless charging mode and design structure, which is configured such that one wireless charging system has different charging modes so that an optimum wireless charging mode can be selected according to the need of charging conditions.

Technical Solution

In order to accomplish the above object, the present invention provides a wireless charging system having different charging modes, the system comprising: a method of providing a coil having different charging modes in one set, which is performed by providing separate coils or providing a lead wire in the middle of one coil, when the coil having at least two different charging modes is provided in the one set in a receiver for the wireless charging system using non-contact magnetic induction, wherein when one charging mode is selected for one coil set, a status value of the coil for transmitting and receiving wireless power energy is detected, thereby enabling one charging mode to be selected.

Furthermore, when a plurality of separate other coils is provided in one set, one of the plurality of coils may be selected, thereby enabling the wireless charging mode to be selected, and when the lead wire is provided in the middle of the one coil, both end terminals of the one coil may be selected or one of the both end terminals and a lead wire may be selected, thereby enabling the wireless charging mode to be selected.

Also, when the coil set is provided in plural number, each of the plurality of coil sets may be provided with the coil having different charging modes.

Moreover, the coil having the different charging modes may be provided only in a transmitter coil or only in a receiver coil.

Meanwhile, the coil having the different charging modes is provided in both the transmitter coil and the receiver coil.

Advantageous Effects

According to the present invention, different charging modes are mounted in one wireless charging system so that a charging mode appropriate for optimum conditions can be selected according to states and charging conditions wireless power transmitting and receiving devices, thereby providing a wireless charging system having different charging modes, which enables a charging mode appropriate for optimum conditions according to a charging distance to be selected.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Hereinbelow, a design structure of a receiver for a wireless charging system according to the present invention will be described in detail.

Figure 1:
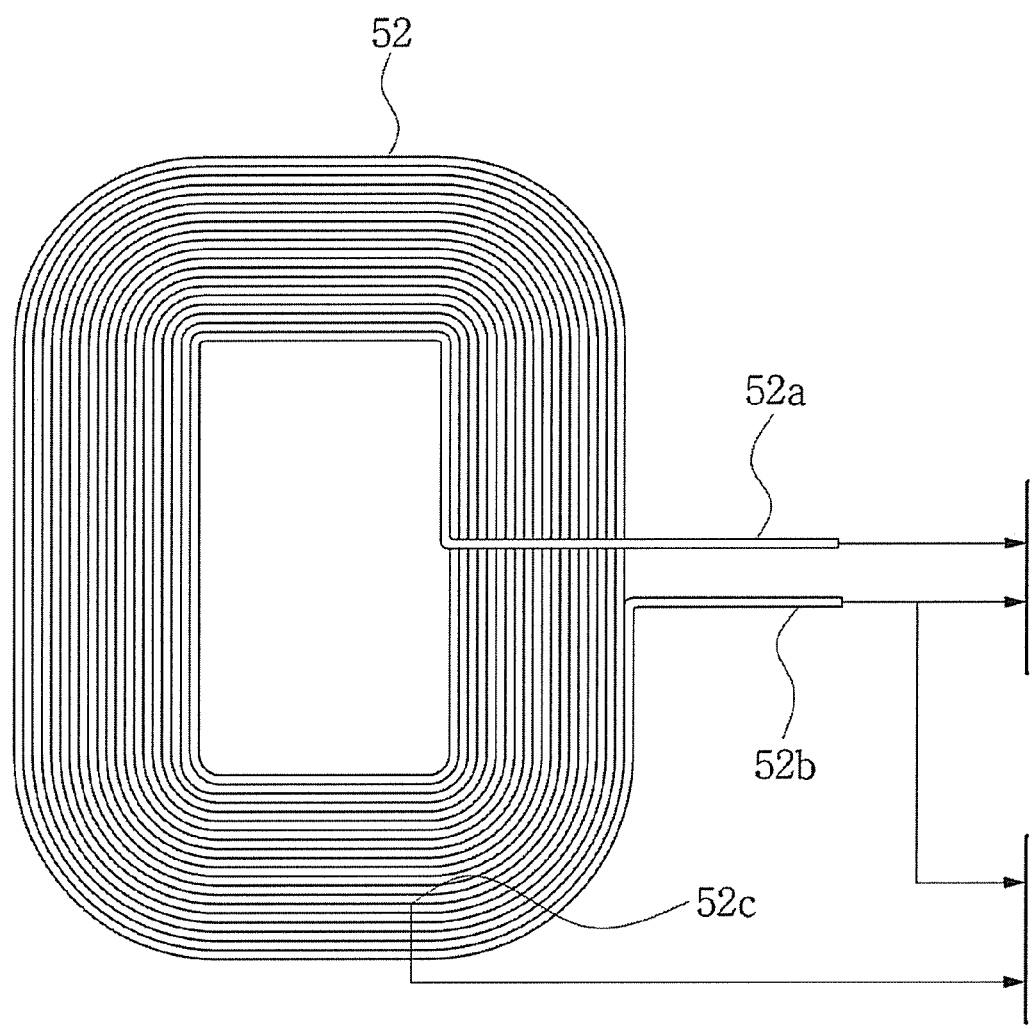
FIGS. 1 and 2 are views showing an embodiment in which a wireless charging coil having different charging modes is provided in one coil set.
Figure 2:
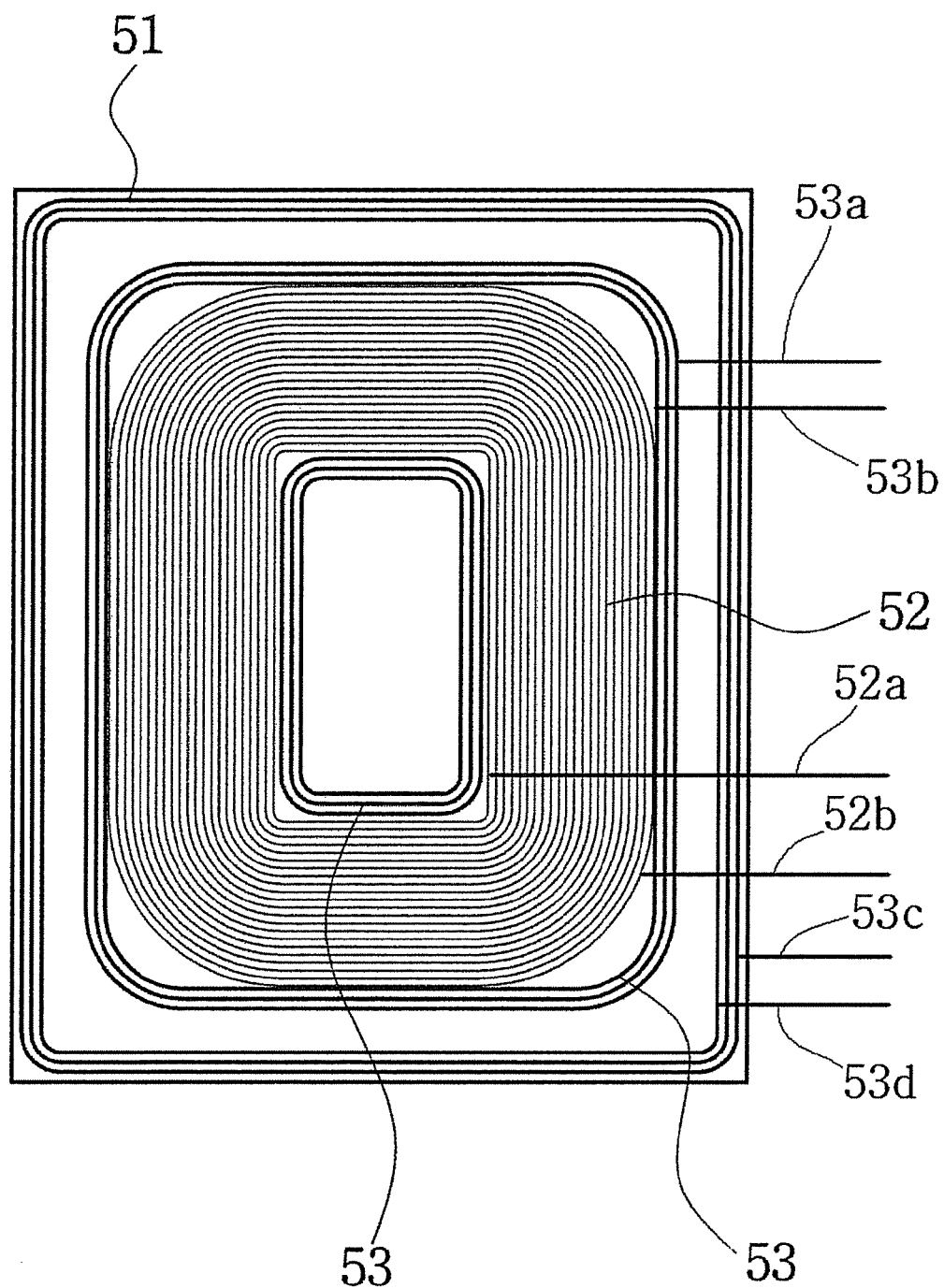

FIGS. 1 and 2 are views showing an example in which a wireless charging coil having different charging modes is provided in one coil set.

There may be several modes for charging wireless power energy, such as a wireless power consortium (WPC) mode, a magnetic resonance mode, a KTP mode (mode independently developed by the present applicant), and the like. Furthermore, when different wireless charging modes exist, this means that charging frequency values are changed, or impedance values of the coil are changed. At this time, when the impedance values of the coil are changed, a length of the coil is also changed.

As shown in FIG. 1, both end terminals 52a, 52b of a reception coil 52 (or a transmission coil) are provided, a lead wire 52c is further provided in the middle of the coil 52. At this time, the both end terminals and the lead wire are connected to individual switching devices so as to be selectively connected to a controller MCU.

That is, the both end terminals 52a, 52b may be connected to the controller, or any one of the both end terminals 52a, 52b may be connected to the lead wire 52c.

Meanwhile, as shown in FIG. 2, separate coils 52, 53 are provided. That is, at the inside or the outside of the coil 52 wound by a wire, the separate coil 53 wound by another wire is further provided.

At this time, in FIG. 2, the wire of the coil is illustrated in a circular form for convenience of illustration, but it may also actually have a form in which the wire is wound from the inside to the outside.

Furthermore, the coil 52 has both end terminals 52a, 52b, and the separate coil 53 also has both end terminals 53a, 53b, 53c, 53d. Accordingly, only both end terminals of the coil 52 may be connected to the controller by the switching devices, or only both end terminals of the separate coil 53 may be connected to the controller.

Also, FIGS. 1 and 2 show the embodiments for the reception coil as an example, but the principle of the different charging modes may be also exactly applied to a transmission coil.

Moreover, as the coil of the present invention, a wireless power consortium (WPC) type coil 52, a KTP type coil 53, a near field communication (NFC) coil 51 used in a near field communication (NFC) may be further provided. Furthermore, the coils 51, 52, 53 are provided in one plate (a substrate or film).

In the drawings of the present invention, the NFC coil 51 is only illustrated in the embodiment of FIG. 2, but it may be also provided in the embodiment of FIG. 1. Accordingly, the NFC coil 51 may not be provided.

A typical wireless charging system includes a transmitter for transmitting electric power energy and a receiver for receiving electric power energy, wherein the transmitter enables a sensor for sensing a certain signal to be driven periodically, and determines whether or not a charging request signal is sensed. When the charging request signal is sensed, an electric power transmission portion of the transmitter is turned on. Furthermore, a battery voltage of the receiver is confirmed through a signal of the receiver, and electric power transmission is performed when a state in which charging is possible is confirmed.

At this time, when such a state has begun in earnest, the receiver receives the electric power energy, and the electric power is charged in a battery of the receiver.

A mode which has been typically used in wireless charging is a wireless power consortium (WPC) mode, and in order for wireless power energy of the WPC mode to be transmitted, the WPC mode should generally have the following conditions.

"Voltage: 7-15V (based on the receiver), Frequency: 100-200 kHz, Current: 5V (0.7 A), Electricity: 3.5 W, Inductance value of coil: 8 to 12 µH (microhenry)"

Meanwhile, the mode has a structure in which the coil and a condenser are connected in series. A medium for transmission of the wireless power energy is antenna loop coils 52, 53, and the antenna loop coils 52, 53 are connected to the condenser in series.

Meanwhile, the KTP mode developed by the present applicant has the following characteristics.

"Voltage: 7-24V (based on the receiver), Frequency: 1 to 6.78 MHz, Current: 5V (1 A), Electricity: 5 W, Inductance value of coil: 600 nH (nanohenry)-2 µH (microhenry)"

At this time, the voltage and current values may not be accurately consistent with the above values, and the values may be in a range of the above values.

Anyway, the largest differences between the WPC mode and the KTP mode are the inductance value of the coil and the frequency value. With regard to the difference between frequency values, the standard thereof may be set as 1 MHz. That is, the WPC mode is 1 MHz or below (Mega Hertz) which is a low frequency, and the KTP mode is 1 MHz or more (Mega Hertz) which is a high frequency.

However, as a practically used frequency, the WPC mode uses a frequency of 100 to 200 KHz, the KTP mode uses a high frequency of 6 to 8 MHz or more.

Also, the inductance value of the coil in the WPC mode ranges from "8 to 12 µH," the inductance value of the coil in the KTP mode ranges from "600 nH to 2 µH."

The KTP mode having these characteristics has considerable advantages. For example, since a high frequency is used in components for oscillating the frequency, miniaturization of the components (the high frequency can typically make a size of the components small) can be realized, and due to the small inductance value of the coil, instead of a spiral coil, the coil formed on a printed circuit board (or a resin substrate) by a printing method can be used as an antenna loop coil.

Since the coil is formed on the substrate, the KTP mode may be advantageous for mass production and may have an effect of a reduction in product cost. Furthermore, the number of turns (the number of times being wound) of the coil in the WPC mode should be 50 or more, and the number of turns of the coil in the KTP mode may be 50 or below.

Meanwhile, the number of turns is based on the number of turns applied to a typical cellular phone, and is a number which is generally calculated based on a case in which a maximum area of the typical cellular phone is within 100 cm$^2$.

Also, when the inductance value in the KTP mode is 3 µH (microhenry) and the inductance value in the WPC mode is 9 µH, the numbers of turns of each of the corresponding coils are different from each other. Accordingly, as shown in the drawing, the coil of the WPC mode is used by connecting lead wires 52a, 52b to the front and end of the coil 52, and the coil of the KTP mode is used by connecting the lead wires 52c, 52b to the middle of the coil 52.

Although a substrate is not illustrated in the drawings, a multi-coil form may be naturally provided on a flexible resin substrate or a typical substrate (for example, a printed circuit board (PCB), a plastic or metal substrate, or the like). Furthermore, as shown in the figure (A), the largest NFC coil 51 is provided at the most outer, and the WPC coil 52 and the KTP coil 53 are provided in the inside thereof.

Accordingly, the substrate in the present invention may be a base substrate (a PCB, a metal or resin substrate, or the like) formed by coating a loop coil, or may be a substrate just for supporting a loop coil. At this time, the substrate for supporting the loop coil may be a simple substrate in a form in which a spiral coil is fixed to a panel (a hard or flexible panel made of metal or resin). That is, the substrate may have a form in which the spiral coil is adhered to the substrate using a tape or an adhesive material.

At this time, the present invention uses one of the two modes, but the mode of the present invention is not limited to the KTP mode or the WPC mode suggested in the embodiments of the present invention. That is, either mode of the two different modes may be selected and applied.

Figure 3:
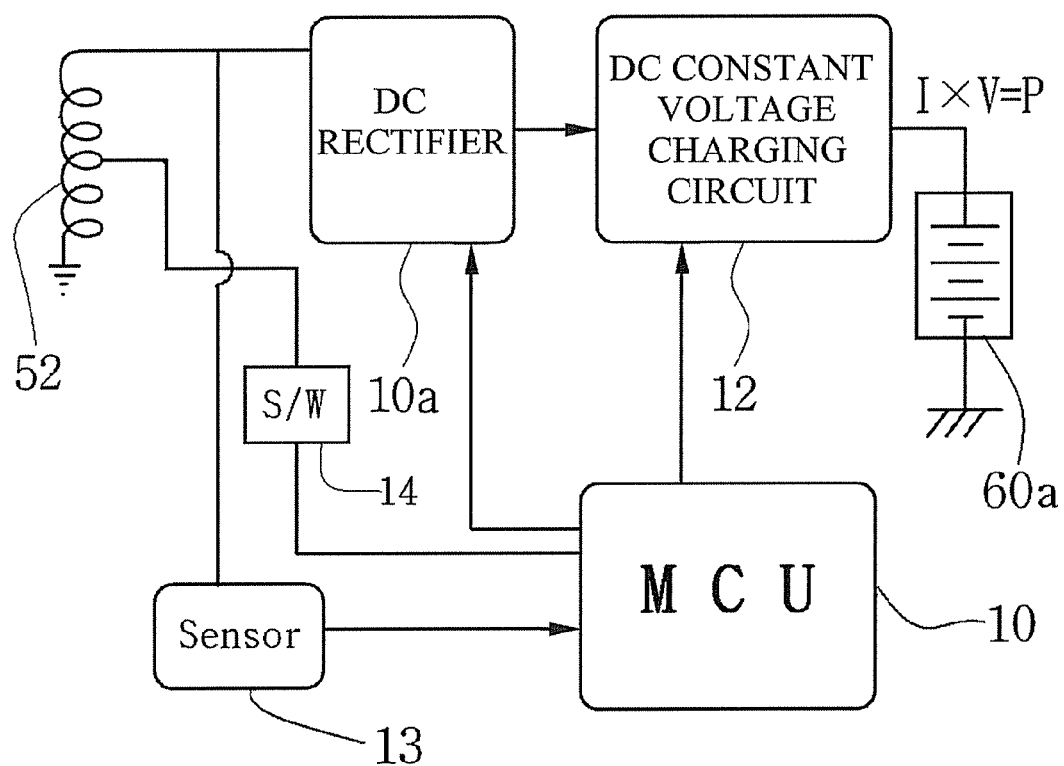
FIGS. 3 and 4 are views showing embodiments of a wireless charging system having different charging modes.
Figure 4:
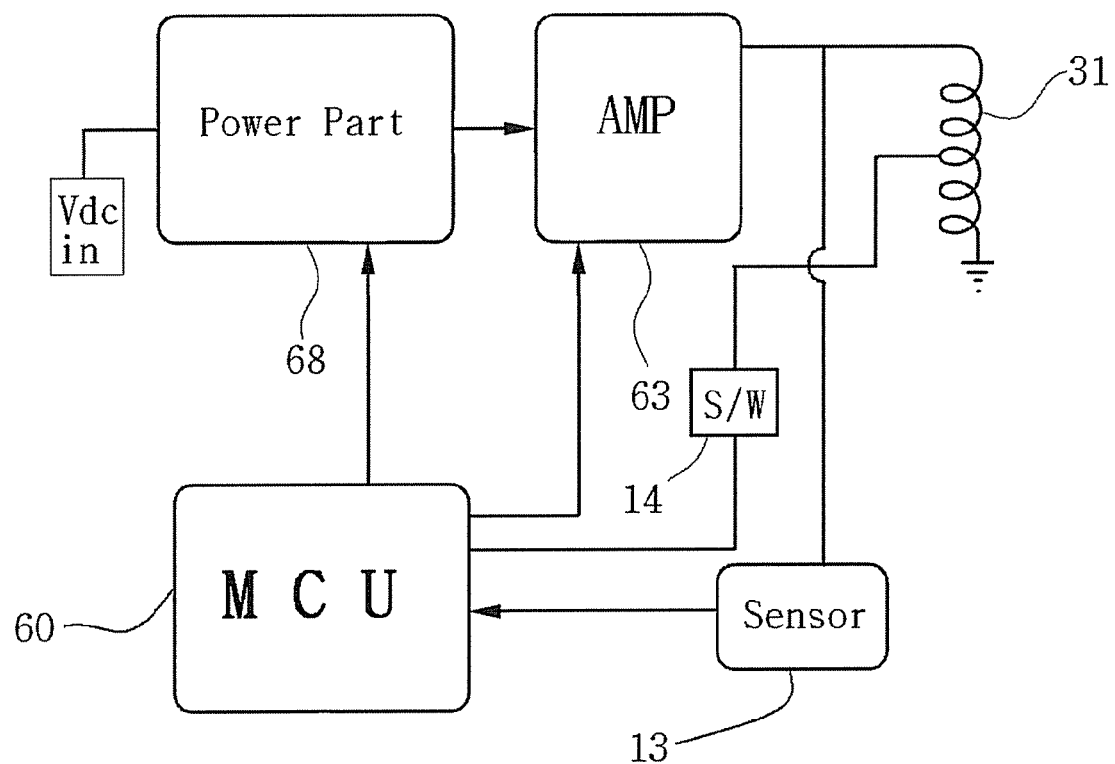

FIGS. 3 and 4 are views showing embodiments of a wireless charging system having heterogeneous charging modes.

FIG. 3 is a view showing a receiver, and the receiver includes a controller 10 for controlling signals and components through a fixed program, and a charging circuit 12 for charging voltage or electric power in a battery of a final cellular phone 60 by adjusting the voltage or electric power according to a voltage of the battery. Furthermore, a rectifier 10a for changing an alternating current to a direct current is also provided.

Meanwhile, the feature of the present invention is that a sensor 13 for sensing a frequency value of the coil is provided. At this time, the function of the sensor is not limited to sensing the frequency value. The sensor may also measure a current, impedance, capacity, voltage value.

Furthermore, when the MCU 10 senses the frequency value of the coil sensed by the sensor 13, a charging mode appropriate to the sensed frequency value may be selected.

In the present invention, a coil suitable for the charging mode is selected by a switching device S/W 14. A mode of selecting the coil appropriate to the charging mode is based on the embodiments of FIGS. 1 and 2.

Moreover, the wireless charging receiver system may also include typical other components in addition to the components illustrated in FIG. 3, but the description of the components which are not directly relevant to the present invention is omitted.

Actually, in the charging WPC mode and the magnetic resonance mode, distances (distance between the transmitter coil and the receiver coil) for an optimum charging condition are different from each other. Accordingly, an optimum charging mode is automatically selected according to a distance between the transmitter coil and the receiver coil by the present invention.

At this time, the mode may be controlled by the switching device 14 or the MCU 10 may directly perform switching control.

FIG. 4 is a view showing an embodiment of a transmitter charging system, and the system includes an MCU (controller) 60, and a power part 68 for supplying a voltage (in generally, 5 to 9 v) which is inputted, and it also further includes an amplifier 63.

Furthermore, the sensor 13 and the switching device 14 are also provided, and operation principles of the sensor 13 and the switching device 14 are the same as those of FIG. 3. Accordingly, the principle for selecting the charging mode in the transmitter charging system is the same as that of the receiver charging system, and the effect is also the same as that of the receiver charging system.

At this time, the mode may be controlled by the switching device 14 or the MCU 10 may directly perform switching control.

Figure 5:
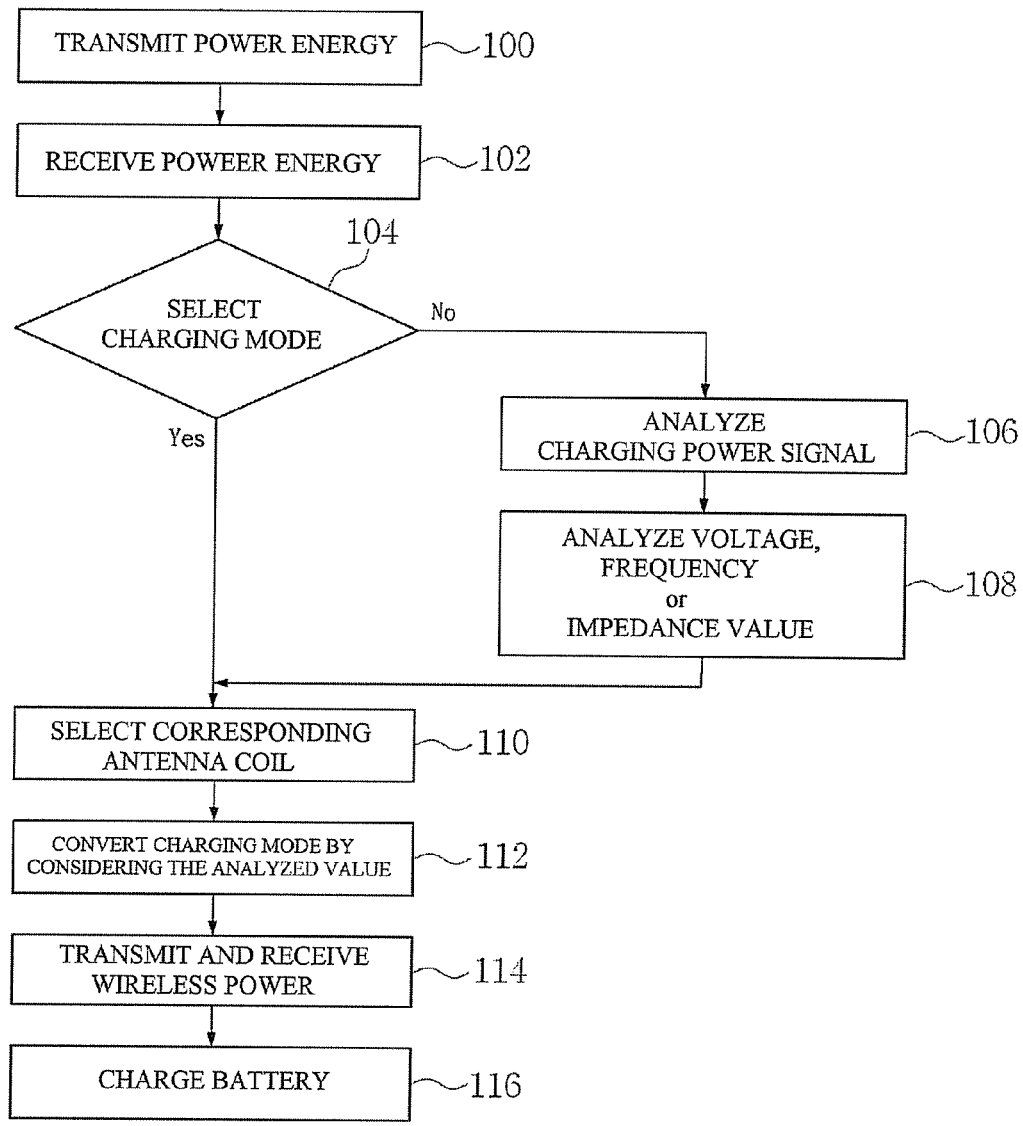
FIG. 5 is an execution flow chart of the present invention.

FIG. 5 is a view of an embodiment showing an execution flow chart of the present invention.

The wireless charging system includes a transmitter for transmitting electric power energy and a receiver for receiving electric power energy, and when wireless power energy is transmitted or received by charging coils 52, 53, 31, the sensor 13 is driven periodically, thus sensing a situation of the charging coils 52, 53, 31 (S 100 to 102).

At this time, the charging mode may be manually selected. Even though a separate manual switch is not illustrated in the drawings of the present invention, the manual selection may be performed by a typical mode. That is, the selection is performed using a switch, the selection by the switch is sensed by the MCU 10, 60, and a terminal of the coil or a lead wire of the coil is selected by the MCU 10, 60 according to the sensing result, thereby enabling the wireless charging mode to be selected (S 104).

When the charging mode is not manually selected, the sensor 13 senses a situation of the charging coils 52, 53, 31. At this time, a frequency, impedance, voltage, capacity value may be analyzed (S 106-108).

Of course, the wireless charging mode may be identified by a local area network signal even though the mode is not illustrated in the drawing of the present invention. When the mode has been identified, a corresponding coil (or a matching part) may be immediately selected.

Meanwhile, when the charging mode may not be identified by the local area network signal, the charging mode may be identified by analyzing a voltage, frequency, impedance, inductance value because the values of the WPC mode, resonance mode and KTP mode are different from each other. Furthermore, the identification is performed by the controllers 10, 60 according to a predetermined mode. When the identification has been completed, the corresponding coils 52, 53, 31 (or a terminal or lead wire) may be selected S 108 to 110.

The reason why the identification may be performed by the controllers 10, 60 is because specific values for each mode are pre-stored in the controllers 10, 60 or a memory device (a memory device may be provided in order to perform a predetermined algorithm even though this is not separately mentioned in the present invention), thus determining whether the mode is any mode based on the stored values.

Furthermore, when a frequency, voltage, impedance or capacity value is changed according to a charging mode, the values are changed according to a selected charging mode. For example, as a practically used frequency, the WPC mode uses a frequency of 100 to 200 KHz, and the KTP mode uses a high frequency of 6 to 8 MHz or more. Therefore, the WPC mode is selected, the frequency value of a coil is changed to 100 to 200 KHz, and when the KTP mode is selected, the frequency value of a coil is changed to 6 to 8 MHz.

At this time, such a change of the frequency value is performed by generating a clock signal which is consistent with the frequency value from the MCU 10, 60, and amplifying the frequency value through the AMP 63.

Accordingly, when a coil, or a terminal or a lead wire is selected according to the selected mode as described above, and a frequency value and the like are determined, wireless power transmission and reception occur and a battery is charged (S 112-116).

When wireless power energy is received through the antenna coils 52, 53, the received electric power energy is controlled by the controller 10, and thus a voltage of 5 V which may be charged in the battery is finally made, thereby enabling the battery to be charged.

That is, in the controller 10, a ratio which should be converted by the rectifier according to the selected mode is determined, and thus a voltage or power appropriate for the ratio is finally outputted.

At this time, in the wireless power system of the present invention, a mode of embodiments in which two modes are selected is provided. That is, when electric power energy is transmitted by one mode of the determined two modes, the receiver may receive the electric power energy in a state of a mode, which allows reception of the transmitted electric power energy.

However, when the modes which allow transmission and reception of the transmitted electric power energy are selected, only one of the two modes should not be selected. That is, one of three or more modes may be selected for the transmission and reception of electric power energy if each of the modes may be identified and selected based on an inductance, impedance, voltage, frequency value of a coil, a local area network signal and the like.

Accordingly, the transmitter may transmit electric power energy using a different mode except for the two modes. Even in this case, how a mode is appropriate for the transmitted power energy is determined based on inductance, impedance, voltage and frequency values of the coil, a communication signal and the like, and the receiver of the present invention is selected according to the corresponding mode, thereby enabling the received power energy to be received.

Figure 6:
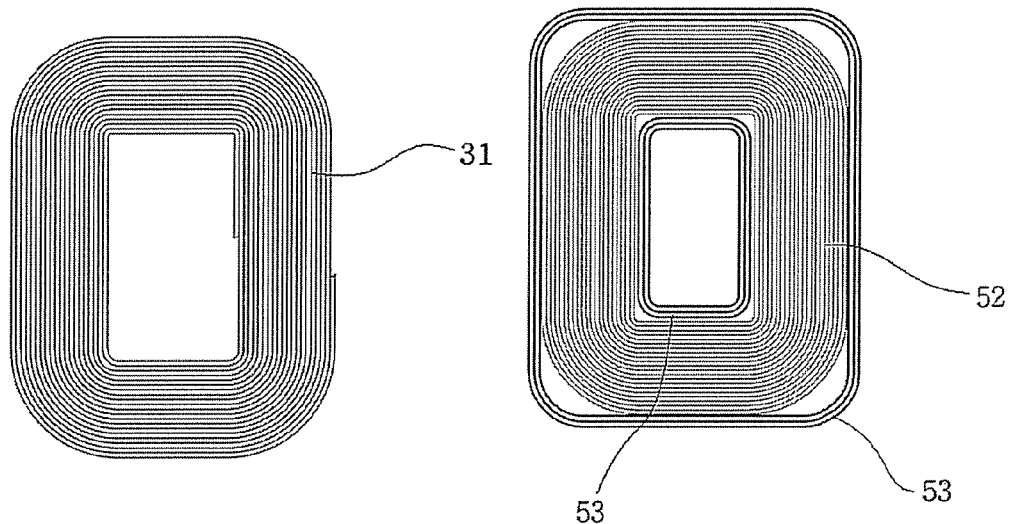
FIGS. 6 to 8 are views showing embodiments of a transmitter coil and a receiver coil.
Figure 7:
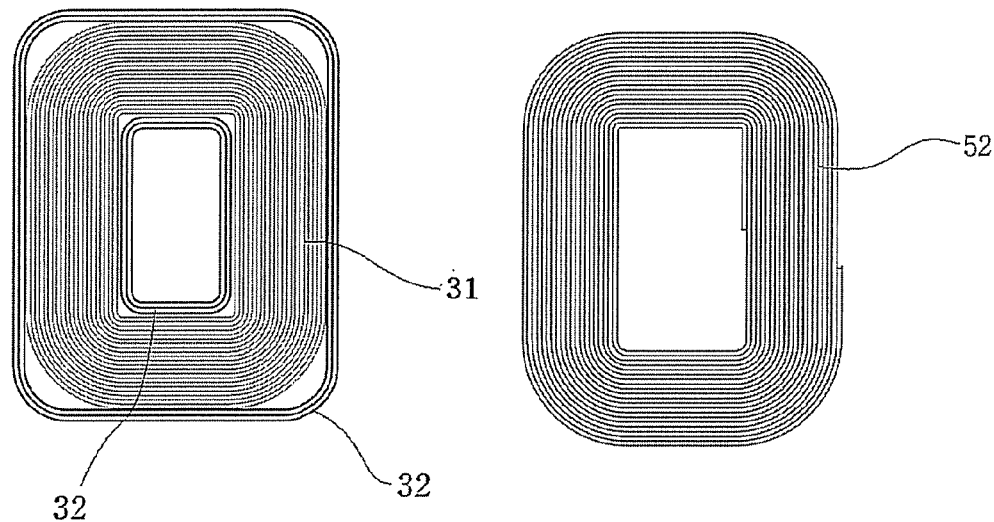
Figure 8:
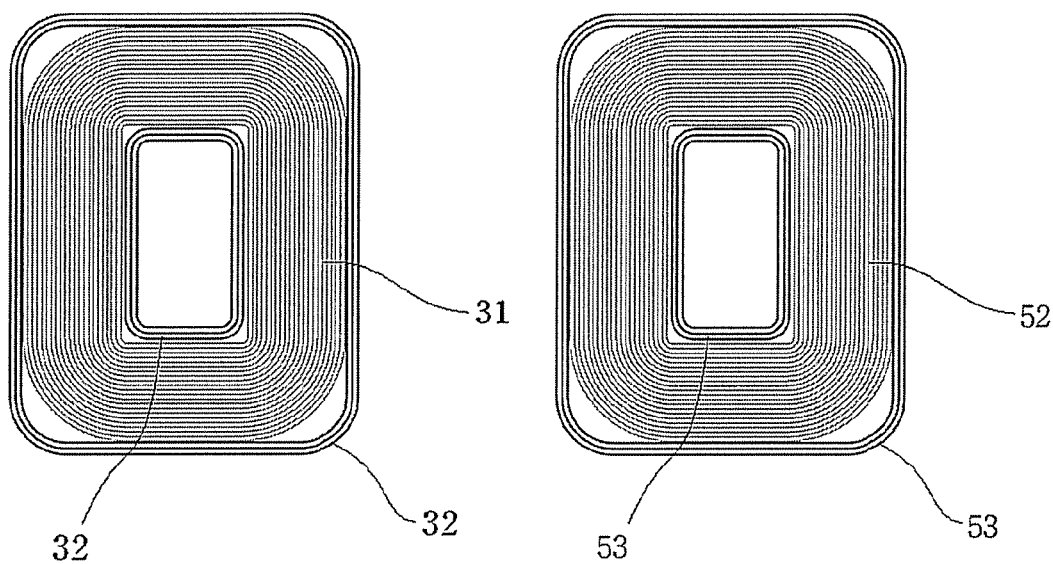

FIGS. 6 to 8 are views showing embodiments of a transmitter and receiver of a coil.

When different charging modes are provided in the wireless charging system, there is no need to provide all the modes in the transmitter and receiver.

That is, as shown in FIG. 6, the transmitter coil 31 may be fixed by one charging mode, and the receiver coils 52, 53 may have the different charging modes. Furthermore, as shown in FIG. 7, the transmitter coils 31, 32 may have the different charging modes, and the receiver coil 52 may be fixed by one charging mode. Also, as shown in FIG. 8, the transmitter coils 31, 32 may have the different charging modes and the receiver coils 52, 53 may also have the different charging modes.

When the receiver coil 31 is fixed by one mode, the receiver coils 52, 53 are selected by the controller 10 of the receiver, and when the receiver coil 52 is fixed by one mode, the transmitter coils 31, 32 are selected by the controller 60 of the transmitter.

Similarly, when the transmitter coils 31, 32 are provided by the different modes, and the receiver coils 52, 53 are also provided by the different modes, the transmitter coils 31, 32 are selected by the controller 60 of the transmitter, and the receiver coils 52, 53 are selected by the controller 10 of the receiver.

Figure 9:
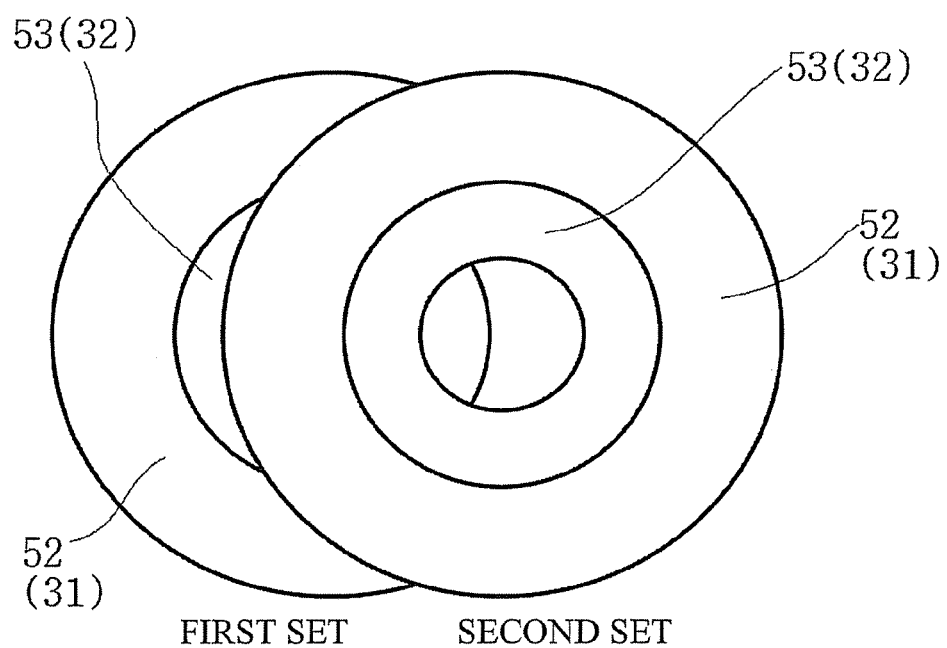
FIGS. 9 to 11 are views showing embodiments of a multi-coil form.
Figure 10:
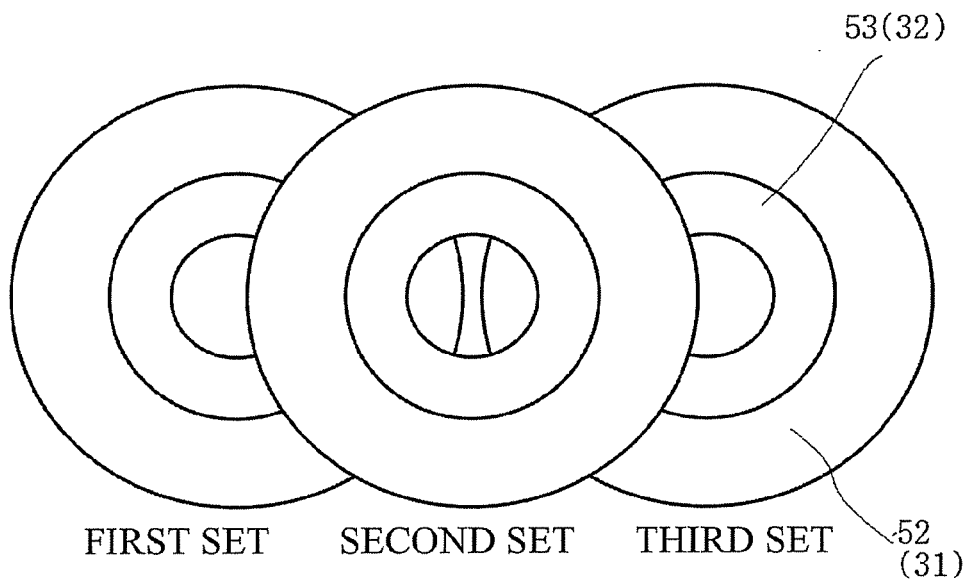
Figure 11:
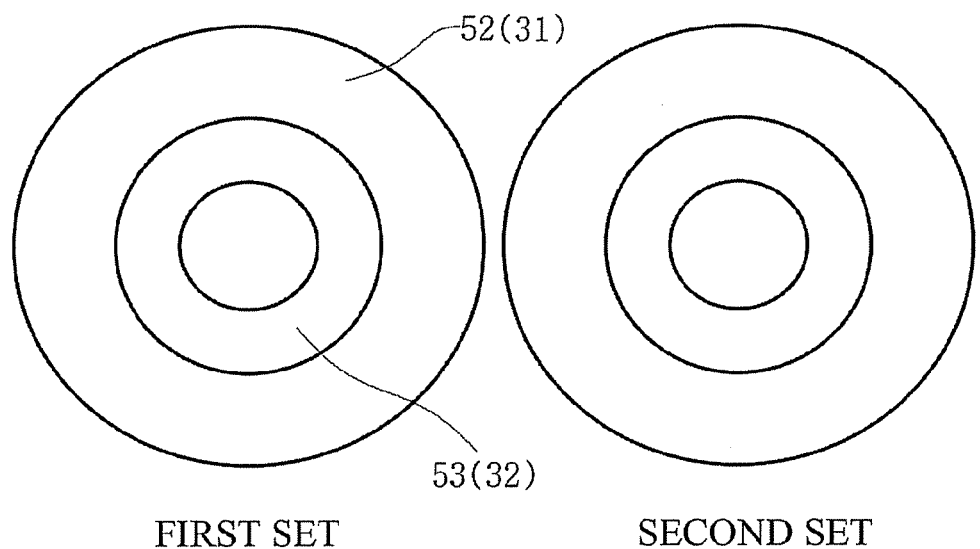

FIGS. 9 to 11 are views showing embodiments of a multi-coil form.

A separate second coil 53 in which a first coil 52 in a form of being wounded by a wire is wound by another wire at the inside or the outside is further provided, and the first coil and the second coil use different charging modes from each other.

Furthermore, when the first coil and the second coil form one coil set, the coil set is not needed to be provided as only one coil set. That is, the coils may be provided in a multi-coil form.

That is, a first set, a second set, a third set, and an $n^{th}$ set may be provided.

Furthermore, as shown in FIG. 9, the two coil sets may be provided to overlap each other, as shown in FIG. 10, the three coil sets may be provided to overlap each other, and as shown in FIG. 11, the two coil sets may be provided not to overlap each other.

At this time, each of FIGS. 9 to 11 shows one example, and a number of coil sets is not limited to two or three. Also, in the present drawings, a multi-coil form may be provided and a coil having different charging modes may be provided.

Figure 12:
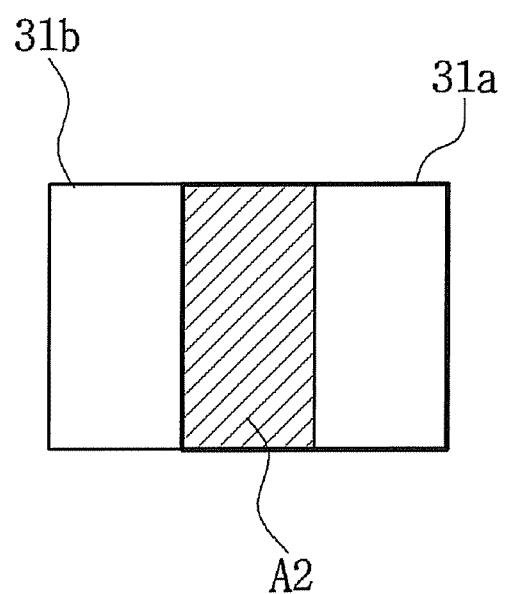
FIGS. 12 and 13 are views of embodiments showing overlapping conditions.
Figure 13:
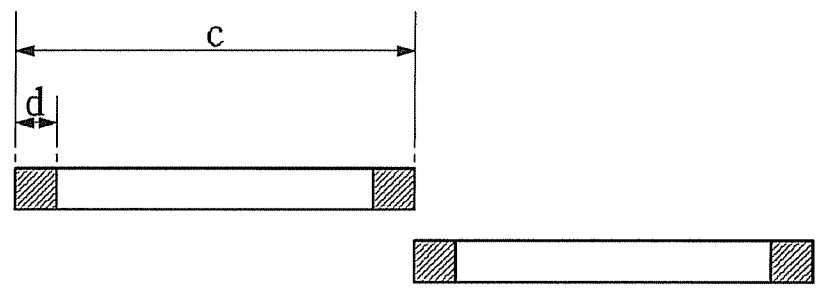
Figure 13:
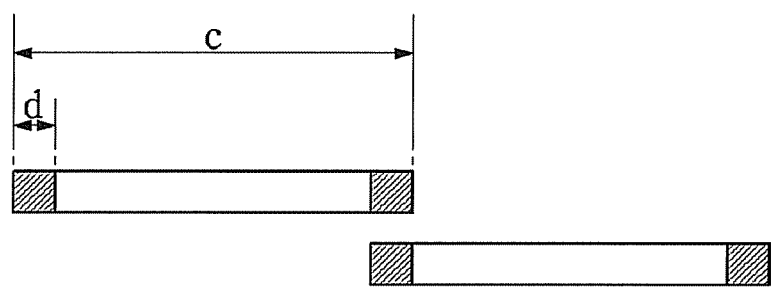
Figure 13:
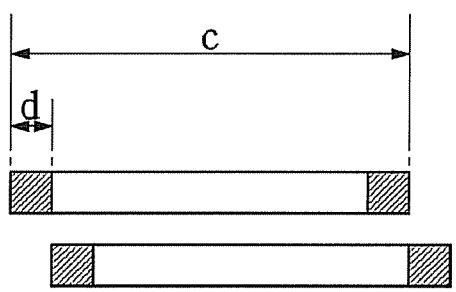

FIGS. 12 and 13 are views of embodiments showing an overlapping condition.

FIG. 12 is a view showing an embodiment of an overlapping area ratio. The overlapping of FIG. 12 is intended to increase uniformity of a magnetic flux rather than increasing strength of the magnetic flux.

As shown in the drawing, when an area in which a first outer coil 31a and a second outer coil 31b overlap is A2, a value thereof may be expected in consideration of a purpose of the overlapping of the coils. As illustrated in the embodiment of the previous drawing, typically, the reason why the outer coil 31 and the inner coil 32 exist is intended to reduce a deviation in magnetic flux. Similarly, a design in which the coils overlap each other is intended to reduce a deviation in magnetic flux. Accordingly, in light of this matter, an overlapping area is not good to be too big or too small. For example, when an area of the coils is 100, it is appropriate that the overlapping area is in the range of about 20 to 80.

However, the overlapping area may be in the range of about 10 to 90 for the convenience of a design.

FIG. 13 is a view of an embodiment showing a ratio of an overlapping length. (A) shows a case in which the coils do not overlap, (B) shows a case in which the coils overlap as much as a coil length, (C) shows a case in which the coils overlap by excluding a length corresponding to a coil length. At this time, (B) shows overlapping intended to increase the strength of a magnetic flux.

Considering each of the cases, the cases may necessarily have improved uniformity of the magnetic flux compared to a case in which only one coil exists. This is because the number of coils is increased under the same distance. Furthermore, it is due to a structure in which the increased coil numbers are not consistent with each other. First, the cases of (B) and (C) show improved uniformity of the magnetic flux compared to the case of (A) without question. In the drawing, when "c" is an entire length of the coils, "d" is a length of only one coil, and a total number of lines of magnetic force emitted from two coils is F, by dividing the total number of lines of magnetic force by a distance, a magnetic flux density per the distance may be considered. (Practically, the magnetic flux density is indicated as an area, but in the present embodiment, this shows one example of a method for comparing magnetic fluxes to each other.

In the case of (A), the magnetic density based on the distance is M/2c, in the case of (B), the magnetic density based on the distance is M/(2c−2d), and in the case of (C), the magnetic density based on the distance is M/(C+d). That is, in both the cases of (B) and (C), the magnetic flux density is increased compared to the case of (A). Accordingly, when an overlapping extent is represented by a distance, a minimum overlapping distance becomes "d", and a maximum overlapping distance becomes "c−d." When the overlapping distance is represented as a ratio, it becomes from minimum of "d/c" to maximum of "(c−d)/c." When d is 0.4 cm, and c is 4 cm, the overlapping distance becomes minimum of 10 to maximum of 90.

Figure 14:
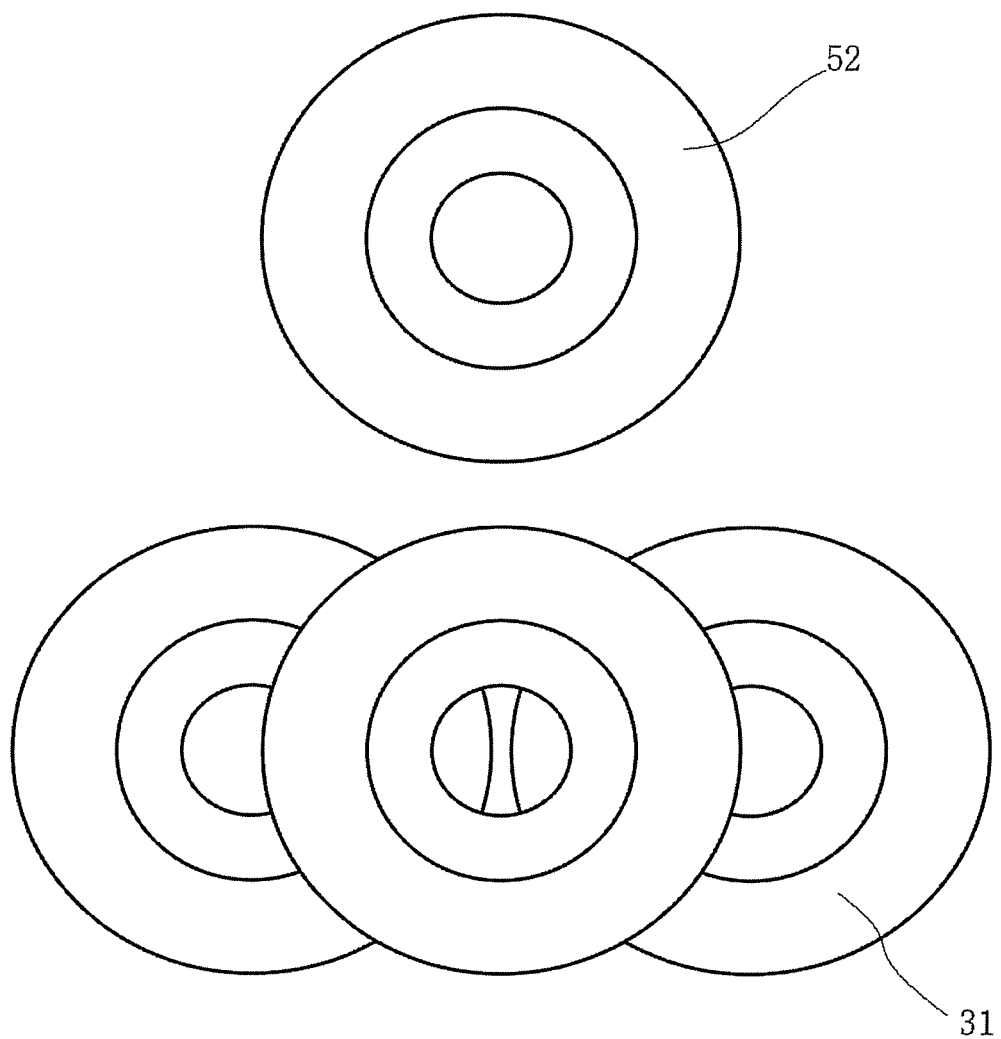
FIG. 14 is a view showing another embodiment of the receiver coil and the transmitter coil.

FIG. 14 is a view showing another embodiment of the receiver and transmitter coils.

In general, a size of a transmitter device may be large, and a size of a receiver device may be small when the receiver device is mounted to a smart phone and the like. Accordingly, the transmitter coil 31 may be in a multi coil form, but the receiver coil 52 may be a single coil.

Furthermore, the transmitter coil 31 is fixed by one mode, the receiver coils 52, 52 may be provided by different charging modes. Also, the transmitter coils 31, 32 may be provided by different charging modes, the receiver coil 52 may be fixed by one mode. Moreover, the transmitter coils 31, 32 may be provided by different charging modes, and the receiver coils 52, 53 may be provided by different charging modes.

Figure 15:
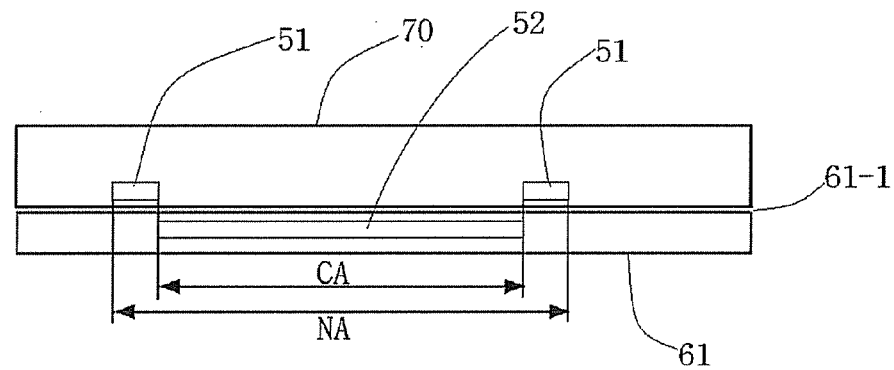
FIGS. 15 and 16 are views showing embodiments in which an NFC coil is provided.
Figure 16:
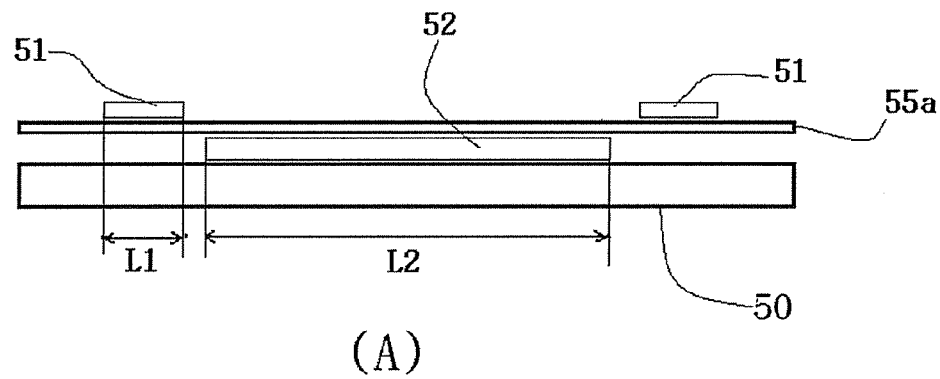
Figure 16:
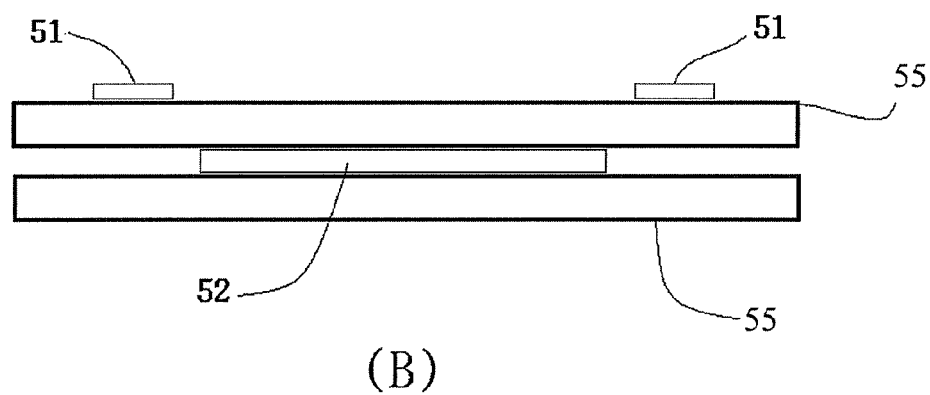

FIGS. 15 and 16 are views showing embodiments in which an NFC coil is provided.

FIG. 15 is a view showing a case in which areas of the wireless power receiving coil 52 and the NFC coil (51) should not overlap each other even though the coils are provided in different layers from each other. (For example, the coil 52 may be provided in a cellular terminal case 61, the NFC coil 51 may be provided in a main body 70.)

That is, an area CA of the coil 52 is formed at a part in which the NEC coil 51 is not formed in an entire area NA in which the NFC coil 51 is formed. Of course, even though the areas may partially overlap, they should not overlap to such a degree as to obstruct communications.

Also, the above drawing illustrates an embodiment in which the NFC coil 51 is provided higher than the coil 52, but even when the NEC coil 51 is provided lower than the coil 52, the coils should not overlap each other.

Moreover, the above drawing is a view showing an embodiment in which the coil 52 is provided inside the area of the NEC coil, but even when the coil 52 is provided outside the area of the NEC coil 61, the coils should not overlap each other.

FIG. 16 shows a position schematic diagram of a cross section of the coil 52 and the NEC coil 51 which are present in an integral form. (For example, both the coil 52 and the NEC coil 51 are provided in the portable terminal case.)

That is, in the present invention, the wireless power receiving coil 52 and the NEC coil 51 may be integrally provided.

As shown in (A), the coil 52 and the NEC coil 51 may be formed on the same substrate, and an insulating layer 55a may be coated therebetween. Also, as shown in (B), the coil 52 and the NEC coil 51 may be formed on a separate substrate 55. Furthermore, the substrate 55 may use a typical flexible substrate.

Meanwhile, a relative ratio of the coil 52 to the NFC coil 51 may be set, and in the present invention, the coil 52 may be provided inside the NIFC coil 51. Accordingly, a length L1 of the NFC coil 51 may be a horizontal thickness of the NFC coil 51 (horizontal thickness not vertical thickness). On the contrary, L2 shows a distance of an area occupied by the coil 52. (That is, a form of the coil 52 may have a part in which the inside of the coil is empty, but the empty part is also included in L2.)

In the present invention, a length of L2 is more than at least two times than a length of L1. This is intended to maximize wireless power energy reception.

Also, it is preferable that a distance (this means a right and left distance as viewed at the drawing) between the coil 52 and the NFC coil be spaced to a degree. The spaced distance may be within, preferable, 1 to 10 mm. Furthermore, it may be appropriate that the best spaced distance is about 5 mm.

Meanwhile, in order to implement the present invention, the coils 51 and 52 of the present invention may not be necessarily provided. The coils may be attached to individual components as they are. However, when the coils 51 and 52 may be provided between coils 61-1, the coils 61-1 may be coated with a film and the like.

Figure 17:
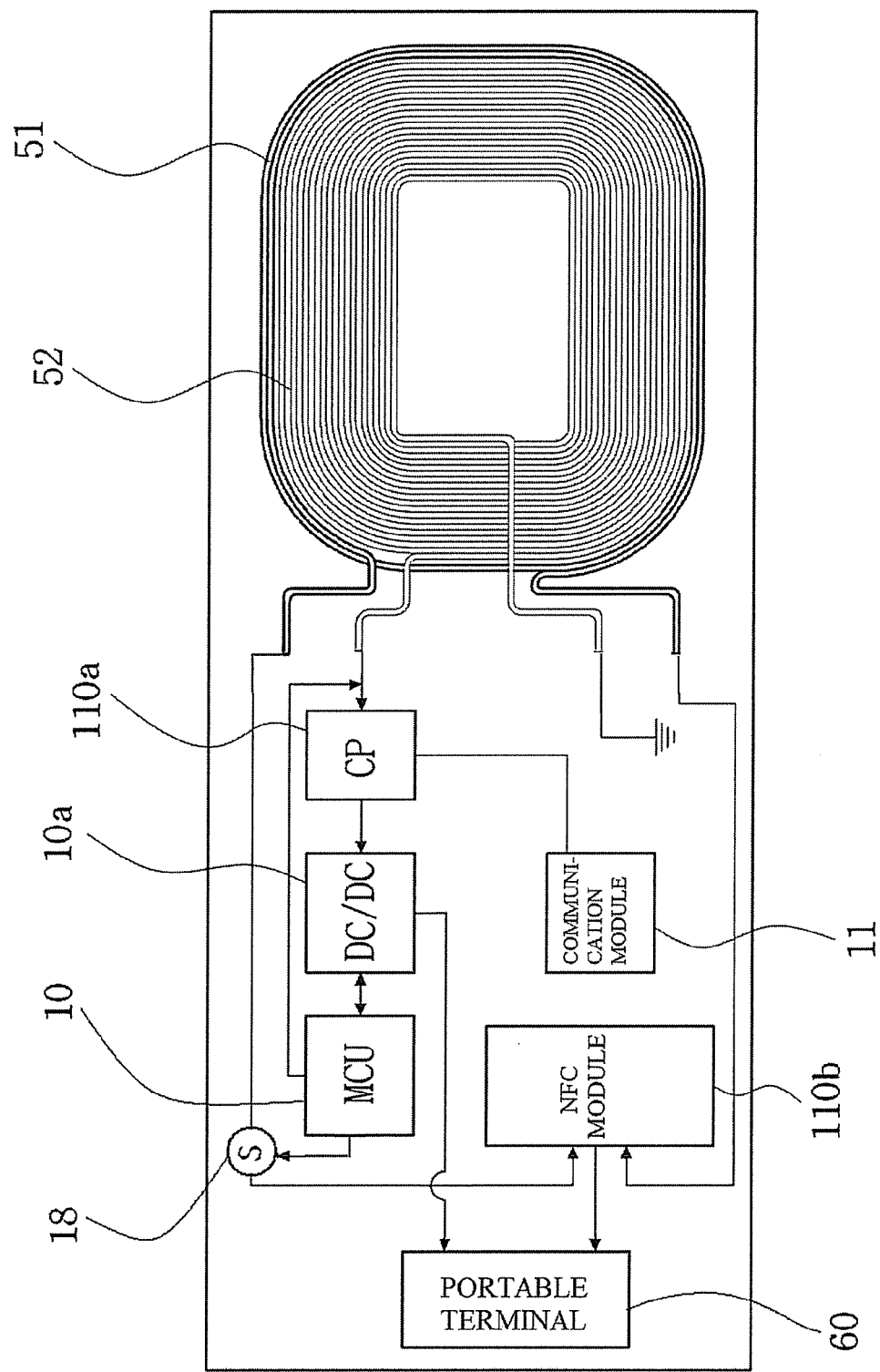
FIGS. 17 and 18 are views of embodiments showing control between a coil and an NFC coil.
Figure 18:
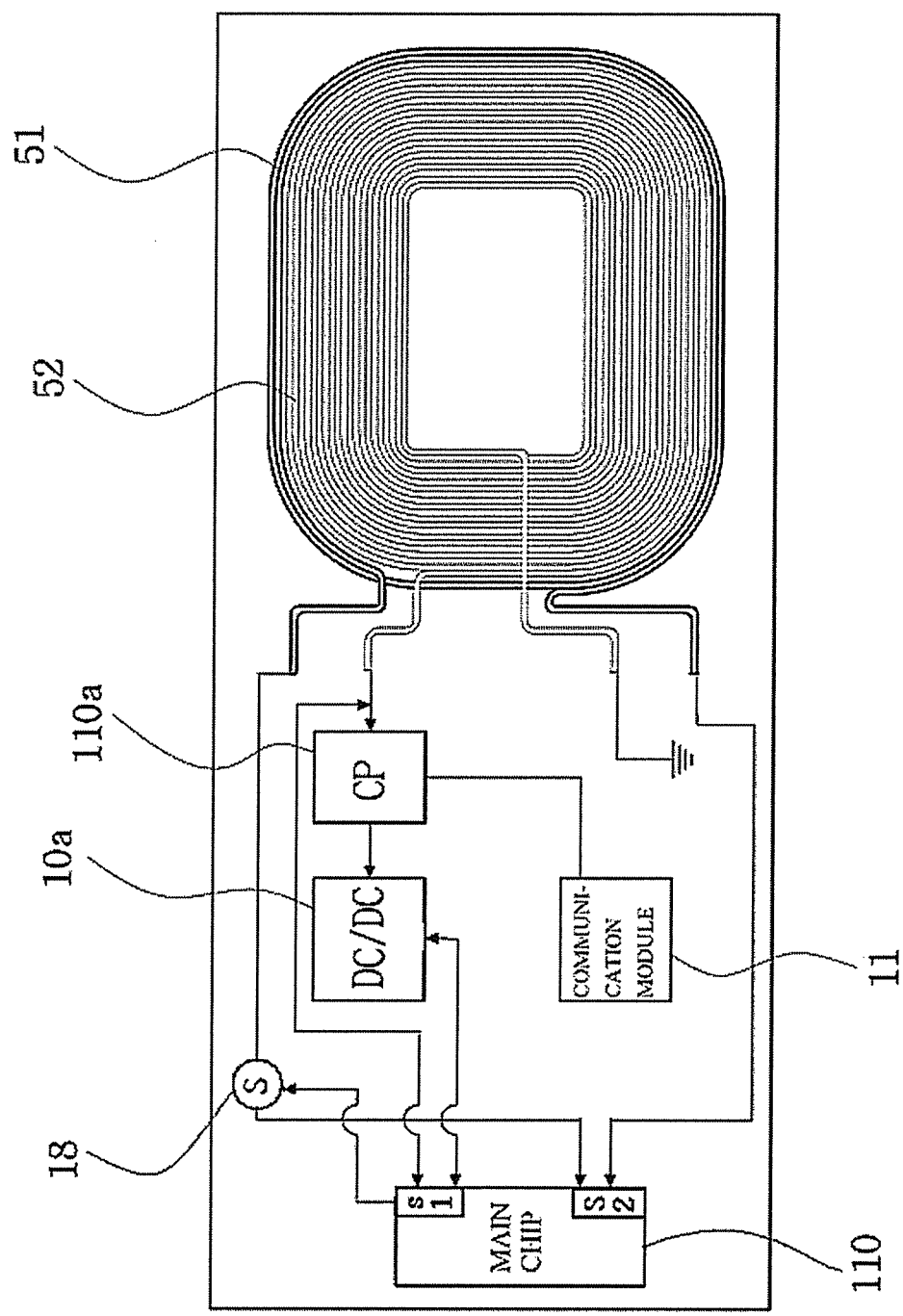

FIGS. 17 and 18 are views of embodiments showing control between the coil and the NFC coil.

In general, the NFC coil 52 is always maintained in an on state. The meaning that the NFC coil 52 is maintained in the on state is that the NFC coil 52 and a module for controlling the NFC coil 52 are always connected to each other.

However, when the wireless charging receiving coil 51 transmits or receives wireless power energy, the NFC coil is maintained in an off state. At this time, that the NFC coil is maintained in the off state means that a connection of the NFC coil 52 and the module for controlling the coil 52 is blocked.

FIG. 17 is a block diagram of an embodiment showing such a principle.

A process in which the electric power energy received in the coil 52 is supplied to the portable terminal 60 is similar to that of the former embodiment. However, data received through the NFC coil 51 is transmitted to the portable terminal 60 through a separate path.

As shown in the drawing, the receiver coil 52 and the NFC coil 51 are provided, and the two coils are separated from each other on the basis of a circuit. Accordingly, the controller 10 for controlling a wireless power receiver and an NFC module 110b for controlling the NFC coil 51 are separately provided. At this time, the meaning that they are separately provided is that functions thereof are separated, and accordingly, the controller 10 and the NFC module 110b may be provided as separate components or the functions thereof may be distinguished in one component.

Therefore, an accurate meaning that the coils are divided into two paths is that a connecting line from the coil 51 to the controller 10 and a connecting line from the NFC coil 51 to the NFC module 110b are separated from each other.

The NFC module 110b refers to an NFC transmission module, and the NFC transmission module is composed of an analogue interface, an R/F level interface, card mode detector, and the like and functions to transmit data between terminals at a short distance of 10 cm.

Typically, NFC is one of electronic tags (RFID) and refers to a technology for transmitting data between terminals at a short distance of 10 cm with a non-contact short-range wireless communication module using a frequency band of 13.56 Mz. NFC has been widely utilized in payment devices, transmission devices of product information or travel information for visitors used in supermarkets or general stores, traffic devices, access control locking devices and the like.

Furthermore, a switch 18 may be further provided, and the switch may block a connection of the coils by control of the controller 110a for controlling the coils, and when the connection is blocked by the switch 18, the function of the NFC coil 51 is stopped.

Consequently, as the controller 10 controls the wireless power receiving coil, wireless power reception energy is received, and the controller 10 blocks the switch, thereby enabling the function of the NFC to be stopped.

Meanwhile, when the wireless power reception energy is received, with regard to a mode of stopping the NFC function, different modes except for the mode presented in the present invention may be also used. The most important matter is that when the controller 10 controls the receiver coil 51, a control command for stopping the NFC function is performed.

FIG. 18 is a view of another embodiment, and in a main chip 110 (a chip for controlling the portable terminal entirely) which is present in the portable terminal 60, the wireless power receiving coil 51 and the NFC coil 52 are controlled.

That is, the main chip 110 of the portable terminal performs the functions of the controller 10 and the NFC module of FIG. 17. To do so, a sector which enables the functions of the controller 10 and the NFC module 110b in the main chip 110 to be performed is provided.

Figure 19:
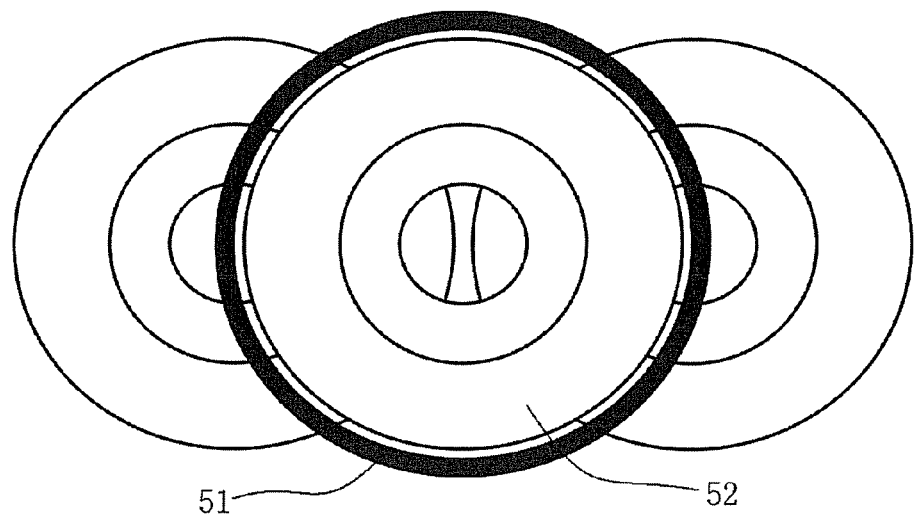
FIGS. 19 and 20 are views of embodiments showing a position of the NFC coil in a multi-coil form.
Figure 20:
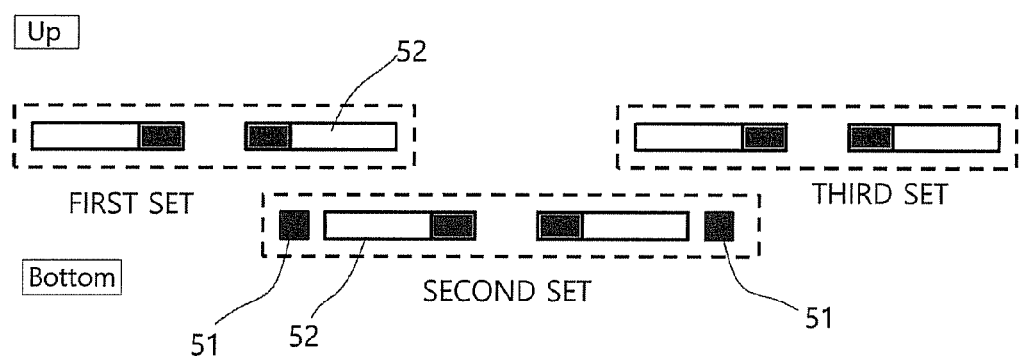

FIGS. 19 and 20 are views of embodiments showing a position of the NFC coil in a multi coil form.

When the receiver device has a size of a certain extent, the receiver coil may be also composed of a multi-coil form. Furthermore, when the NFC coil 51 is mounted to the receiver coils 51, there is no need to mount the NFC coil to all receiver coils. That is, the NFC coil 51 is mounted to a part of the receiver coils.

Furthermore, FIG. 19 is a view of an embodiment showing a case in which the NFC coil 51 is mounted to only one coil.

Meanwhile, FIG. 20 is a view showing an arrangement in which the NFC coil 51 is mounted. In the present invention, when a coil of different modes is provided as a set of coils, the NFC coil is mounted to a set of coils positioned at the undermost portion (or a direction in which the wireless power energy is received or the NFC data energy is received).

The NFC coil 51 is mounted to a second set of coils which is a set of coils positioned at the undermost portion (or a direction in which the wireless power energy is received or the NFC data energy is received) as viewed in the drawing.

Figure 21:
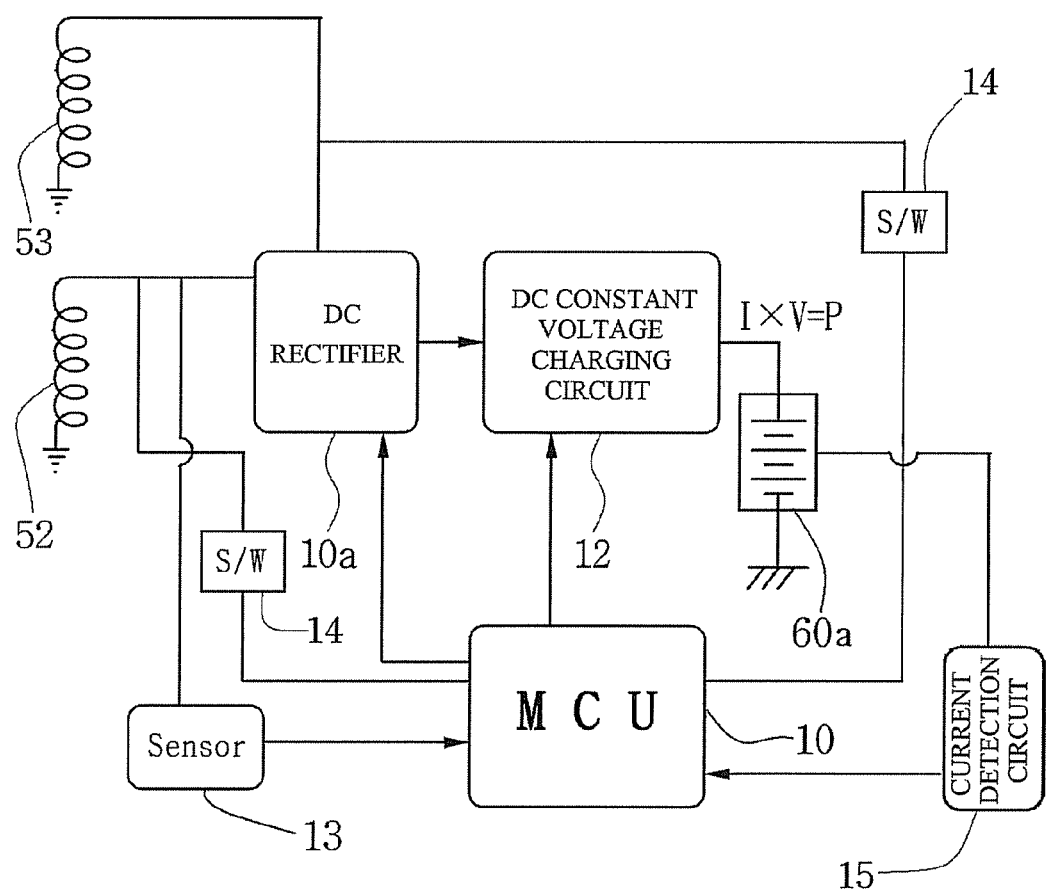
FIG. 21 is a control block diagram for a wireless charging mode in which separate coils each having different modes are used in one set.

FIG. 21 is a control block diagram showing a wireless charging mode in which a coil having different charging modes is used in one coil set.

It is a view showing an embodiment in which the coil having different charging modes is provided as one coil set. That is, the coil 52 of the WPC mode and the coil 53 of the KTP mode are individually provided, but when the coils are provided as one set, the coils are separated and are then controlled by the MCU 10. Accordingly, even though the coils are provided as one set, they are separated, and the MCU controls the coils 52, 53. A control method or configuration thereof is similar to that of the former embodiment.

At this time, the coils may be controlled by the switching device 14, but the MCU 10 may directly perform switching control. In the drawing, even though the receiver is illustrated, with regard to the transmitter, a coil appropriate for the selected mode may be selected according to the same principle as that of the receiver.

A novel charging mode is a technology capable of transmitting higher power even in a small area by raising power transmission frequency, and an embodiment thereof may be implemented under a frequency of 7.2 Mhz. In order to perform charging having compatibility between such a novel charging mode and the WPC mode, elements which may be used in common may be implemented by carrying out a sharing design, and elements having a difference may be individually composed.

First, the elements designed in common may be a charging circuit unit 12, the MCU 10, a battery and current detector 15 (or a voltage may be also detected) and the like. Meanwhile, data may be also used in common, and data processing may be also composed by the WPC mode.

With regard to the elements having a difference, since wireless power transmission frequency values are different from each other, the receiver coils may be individually formed according to the frequency values, and the circuit unit for rectifying power energy signals received in the second coil may be additionally formed in the first coil.

Regarding a technology capable of transmitting higher power even in a small area by increasing a power transmission frequency, an embodiment has been implemented under a frequency of 7.2 Mhz. The first coil is configured so that power can be transmitted under the frequency of 7.2 Mhz, and in light of the fact that a high frequency is generated in a microcomputer, and power under a frequency of a high several Mhz unit is loaded in a frequency oscillator, thereby being transmitting to the first coil, the technology has a difference with the conventional art.

FIGS. 22 to 25 are views showing embodiments in which a resonator (a repeater) is provided.

Figure 22:
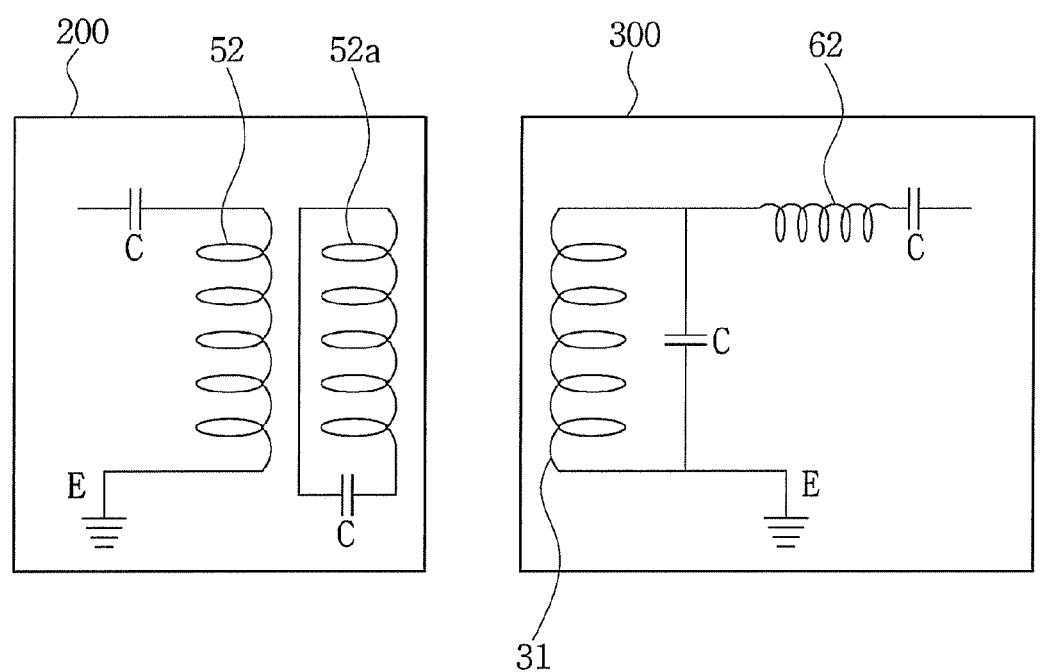
FIGS. 22 to 25 are views showing embodiments in which a resonator (repeater) is provided.
Figure 23:
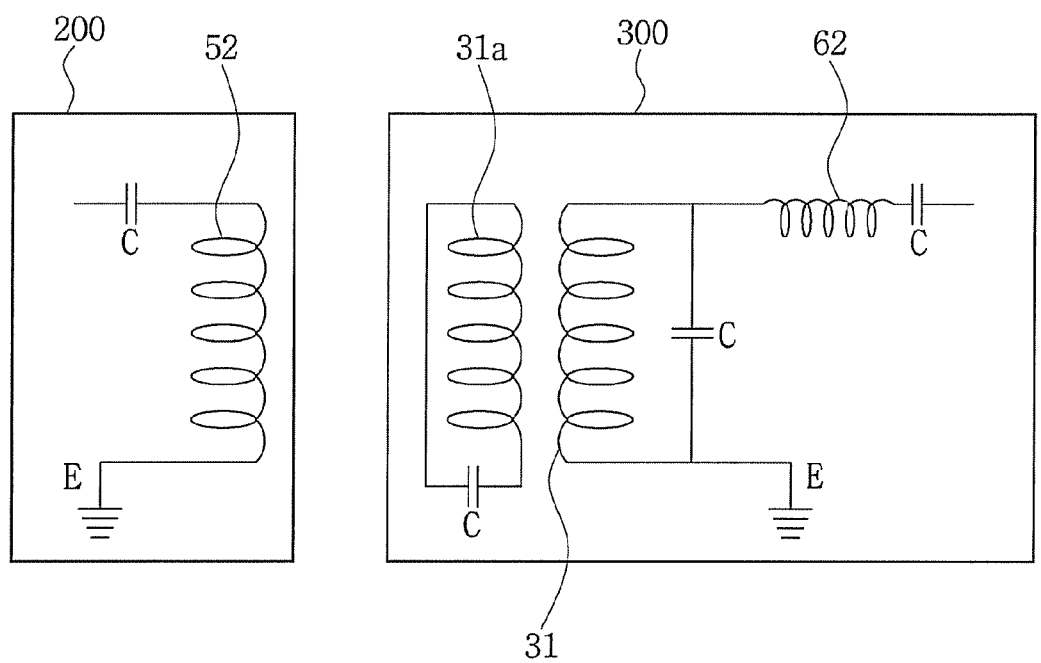

FIG. 22 is a view showing an embodiment in which the resonator (repeater) 52*a* is provided only in a receiver 200, and FIG. 23 is a view showing an embodiment in which the resonator (repeater) 52*a* is provided only in a transmitter 300.

The wireless charger has a general structure for supplying electric power energy, the receiver 200 has a structure in which an antenna loop coil 52 for receiving wireless power is connected to a condenser C in series, and the transmitter 300 has a structure in which an antenna loop coil 31 is connected to the condenser C in parallel. At this time, the series and parallel connections of the loop coil and the condenser may be changed.

Furthermore, typically, the resonator 52*a* may be provided in the receiver 200 (Typically, the coil and condenser C together is called the resonator, but in the present invention, a reference numeral is only added to the resonator coil for the convenience of illustration. Accordingly, the resonator in the present invention also means including both the coil and condenser.), and may be also provided in the transmitter 31*a*.

At this time, the antenna loop coils 31, 52 are used to transmit or receive wireless power energy, and the resonators 31*a*, 52*a* function to amplify wireless power energy.

Figure 24:
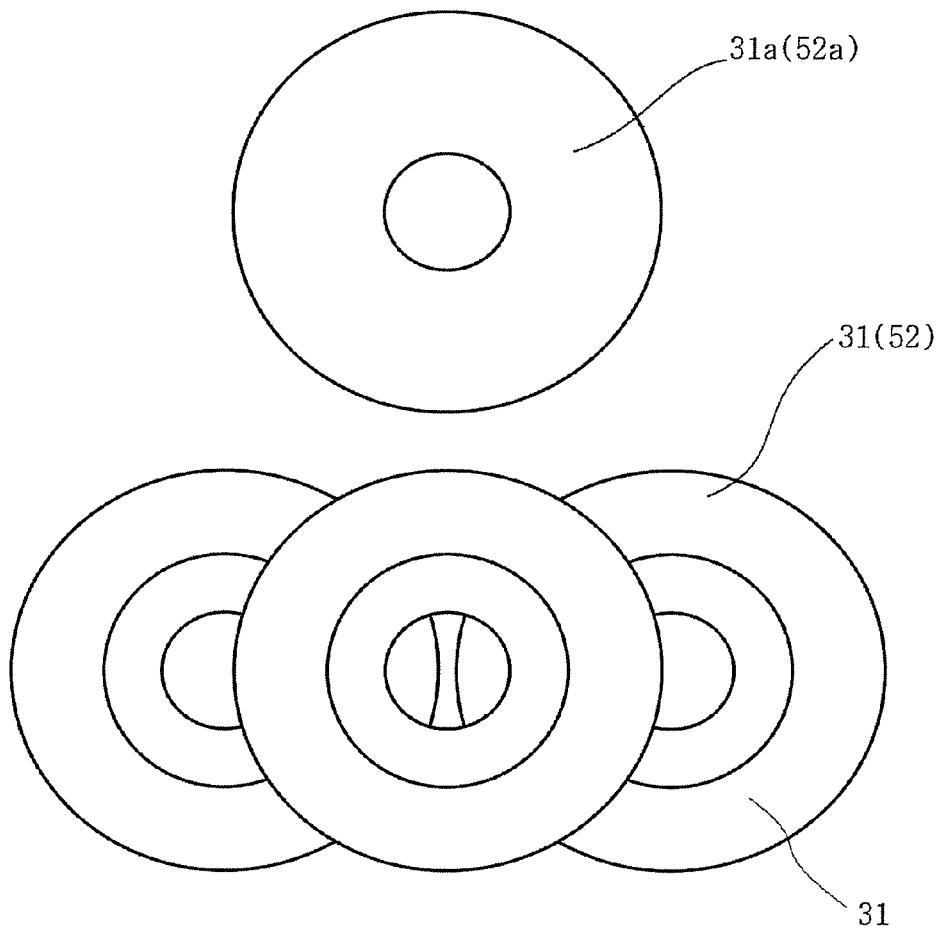
Figure 25:
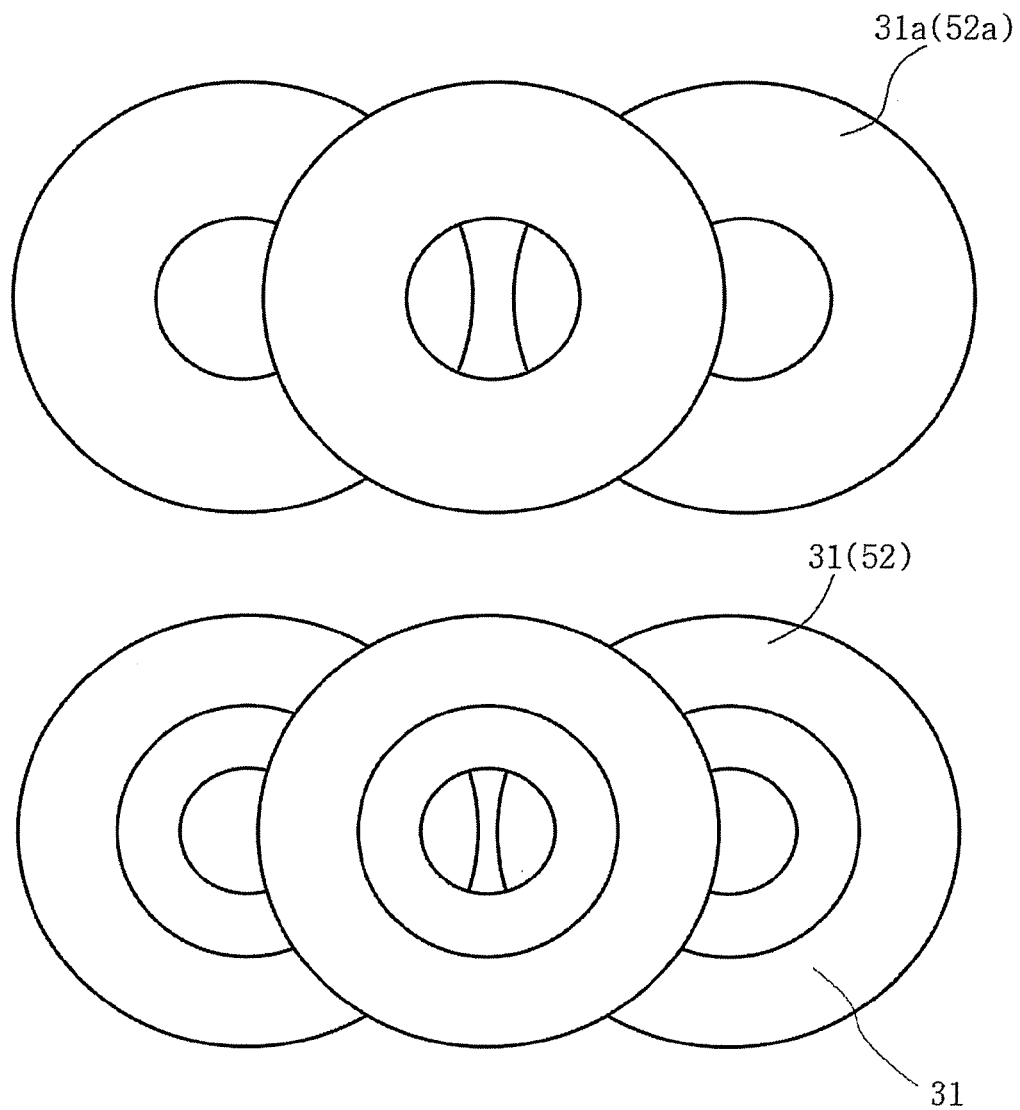

FIG. 24 is a view showing an embodiment in which the transmitter and receiver coils are in a multi-coil form, but the resonator is provided in a single coil form, and FIG. 25 is a view showing an embodiment in which the transmitter and receiver coils are in a multi-coil form and the resonator also is in a multi-coil form.

Of course, the resonator may be provided only in the transmitter, the resonator may be provided only in the receiver, or the resonator may be provided in both the transmitter and receiver. Furthermore, when the transmitter coil and the receiver coil are in a single coil form, the resonator becomes a single coil accordingly.

However, when the transmitter and receiver coils are in a multi-coil form, the resonator may be a single coil or a multi-coil form.

Figure 26:
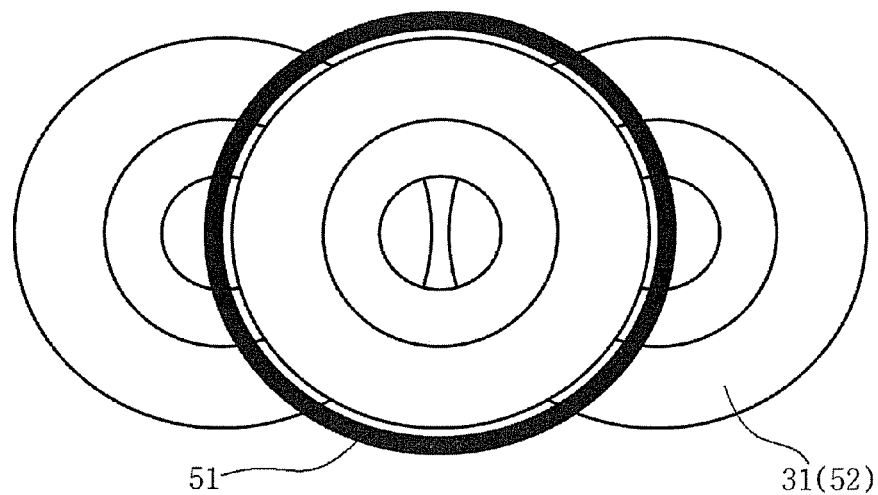
FIG. 26 is a view showing embodiments in which the NFC coil is provided.

FIG. 26 is a view showing an embodiment in which the NFC coil is provided.

When the wireless power receiving coil of the present invention is provided in a portable terminal, the portable terminal is also provided with the NFC antenna coil 51, but the NFC antenna coil 51 is not needed to be provided in plural number. At this time, when one NFC antenna coil 51 is provided, the one NFC antenna coil 51 is positioned at the front as shown in the drawing. Here, the front refers to a direction in which the transmitter of the wireless charger is positioned.

Figure 27:
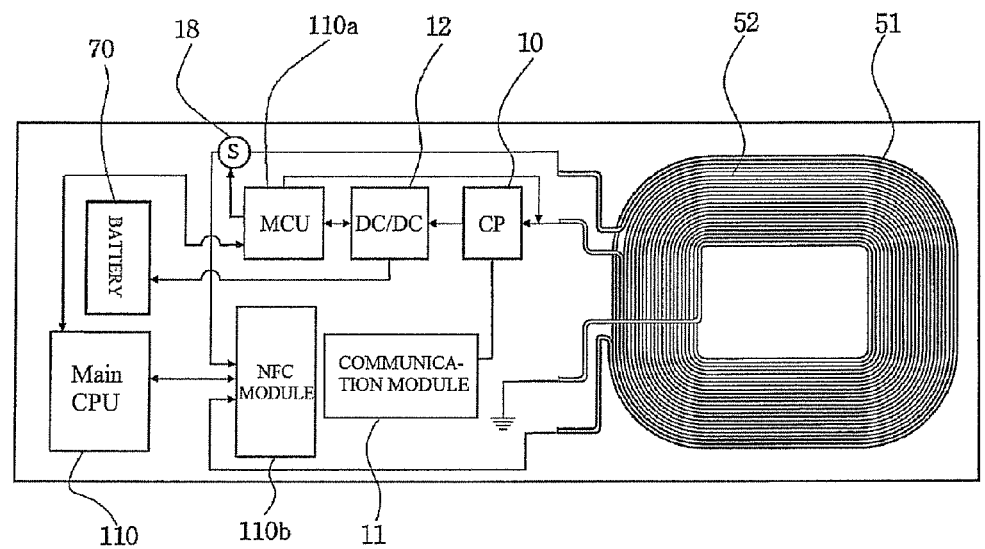
FIG. 27 is a control block diagram of a case in which the NFC coil is provided.

FIG. 27 is a control block diagram showing in a case which the NFC coil is provided.

In general, the NFC module is separately provided, and as shown in the drawing, the receiver coil 52, and the NFC coil 51 are provided, and the two coils are separated based on a circuit. Accordingly, the controller 110*a* for controlling the wireless power receiver and the NFC module 110*b* for controlling the NFC coil 51 are individually provided. At this time, the meaning that they are individually provided is that the functions thereof are separated, and accordingly, the controller 110*a* and the NFC module 110*b* may be provided as individual components, or the functions thereof may be distinguished in one component.

Furthermore, because the NFC coil and the wireless charger should not be simultaneously driven, the switching device 18 is provided for performing control so that the NFC coil and the wireless charger are not simultaneously driven.

Figure 28:
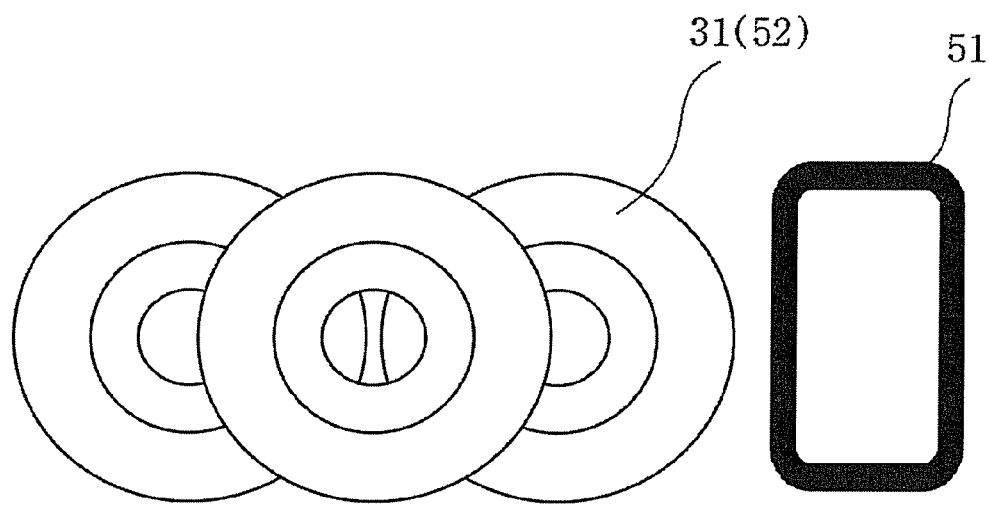
FIG. 28 is a view showing another embodiment in which the NFC coil is provided.

FIG. 28 is a view showing another embodiment in which the NFC coil is provided.

As shown in the drawing, the NFC coil 51 may be provided in a separate area which is not an area in which the coil of the present invention is provided.

Figure 29:
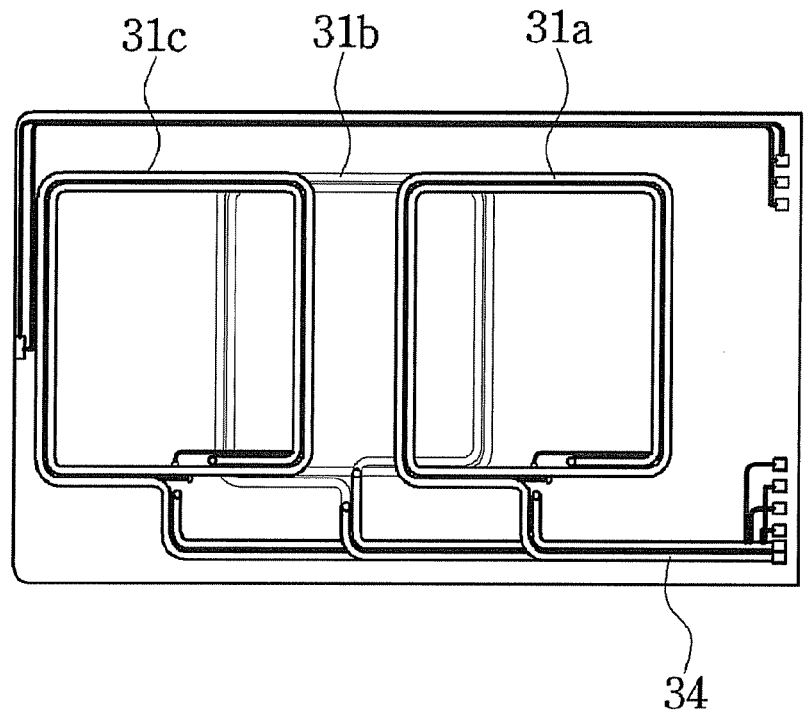
FIG. 29 is a view showing another embodiment of an overlapping coil structure.

FIG. 29 is a view showing another embodiment of an overlapping coil structure.

Like the embodiment of FIG. 13, the drawing shows that antennas (coil) for transmitting and receiving wireless power energy may overlap each other, and two or more antennas may overlap.

Furthermore, the overlapping conditions (an overlapping area or overlapping shape) presented as the embodiments of FIGS. 12 and 13 may be completely applied even when the coil has a quadrangular shape, a circular shape, or other various shapes.

INDUSTRIAL APPLICABILITY

As described above, according to the present invention, different charging modes is mounted in one wireless charging system so that a charging mode appropriate for optimum conditions can be selected according to states and charging conditions wireless power transmitting and receiving devices, thereby providing a wireless charging system having different charging modes, which enables a charging mode appropriate for optimum conditions even according to a charging distance to be selected.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:
1. A wireless charging transmitter comprising:
    at least an antenna set having a base plate, a first antenna formed on the base plate which transmits a wireless charging energy at a frequency less than 1 MHz, and a second antenna formed on the base plate which transmits the wireless charging energy at a frequency more than 1 MHz;
    a sensor sensing at least a sense value selected from currents, impedances, capacities, voltages and frequencies of the first antenna and the second antenna;
    a MCU selecting a charging mode using the sense value sensed from the sensor; and
    a switch selecting the first antenna or the second antenna according to the charging mode.
2. The wireless charging transmitter of claim 1,
    wherein a spiral shape antenna having one end terminal at a center and the other end terminal at an outermost end is provided on the base plate and the first antenna has two lead wires connected to one end terminal and the other end terminal, and the second antenna has at least a lead wire connected to the selected mid-point between one end terminal and the other end of the spiral shape antenna.

3. The wireless charging transmitter of claim 2, wherein at least two antenna sets are provided and a part of an area occupied by each antenna set overlap each other.

4. The wireless charging transmitter of claim 2, wherein the first antenna is a WPC antenna.

5. A wireless charging system having a wireless charging transmitter and a wireless charging receiver,
wherein the wireless charging transmitter comprises:
at least an antenna set having a base plate, a first antenna formed on the base plate for transmitting the wireless charging energy at a frequency less than 1 MHz, and a second antenna formed on the base plate for transmitting the wireless charging energy at a frequency more than 1 MHz;
a sensor which senses at least a sense value selected from currents, impedances, capacities, voltages and frequencies of the first antenna and the second antenna;
a MCU which selects a charging mode using the sense value sensed from the sensor; and
a switch which selects the first antenna or the second antenna according to the charging mode,
and wherein the wireless charging receiver receives wireless charging energy at a frequency more than 1 MHz.

6. The wireless charging system of claim 5,
wherein a spiral shape antenna having one end terminal at a center and the other end terminal at outermost end is provided on the base plate and the first antenna has two lead wires connected to one end terminal and the other end terminal, and the second antenna has at least a lead wire connected to the selected mid-point between one end terminal and the other end of the spiral shape antenna.

7. The wireless charging system of claim 6, wherein at least two antenna sets are provided and a part of an area occupied by each antenna set overlap each other.

8. The wireless charging system of claim 6, wherein the first antenna is a WPC antenna.

9. The wireless charging system of claim 6, wherein the wireless charging receiver further comprises an NFC antenna.

10. The wireless charging system of claim 5, wherein at least two antenna sets are provided and a part of an area occupied by each antenna set overlap each other.

11. The wireless charging system of claim 5, wherein the first antenna is a WPC antenna.

12. The wireless charging system of claim 5, wherein the wireless charging receiver further comprises an NFC antenna.

13. A wireless charging system having a wireless charging transmitter and a wireless charging receiver,
wherein the wireless charging transmitter comprises:
at least an antenna set having a base plate, a first antenna formed on the base plate for transmitting the wireless charging energy at a frequency less than 1 MHz, and a second antenna formed on the base plate for transmitting the wireless charging energy at a frequency more than 1 MHz;
a sensor sensing at least a sense value selected from currents, impedances, capacities, voltages and frequencies of the first antenna and the second antenna;
a MCU which selects a charging mode using the sense value sensed from the sensor; and
a switch which selects the first antenna or the second antenna according to the charging mode,
and wherein the wireless charging receives wireless charging energy at a selected frequency between a frequency more than 1 MHz and a frequency less than 1 MHz.

14. The wireless charging system of claim 13,
wherein a spiral shape antenna having one end terminal at a center and the other end terminal at an outermost end is provided on the base plate and the first antenna has two lead wires connected to one end terminal and the other end terminal, and the second antenna has at least a lead wire connected to the selected mid-point between one end terminal and the other end of the spiral shape antenna.

15. The wireless charging system of claim 13, wherein at least two antenna sets are provided and a part of an area occupied by each antenna set overlap each other.

16. The wireless charging system of claim 13, wherein the first antenna is a WPC antenna.

17. The wireless charging system of claim 13, wherein the wireless charging receiver further comprises an NFC antenna.

18. The wireless charging system of claim 14, wherein at least two antenna sets are provided and a part of an area occupied by each antenna set overlap each other.

19. The wireless charging system of claim 14, wherein the first antenna is a WPC antenna.

20. The wireless charging system of claim 14, wherein the wireless charging receiver further comprises an NFC antenna.

* * * * *